United States Patent
Kitagawa et al.

(10) Patent No.: US 9,350,681 B1
(45) Date of Patent: May 24, 2016

(54) SYSTEM AND METHOD FOR DISTRIBUTED MANAGEMENT OF CLOUD RESOURCES IN A HOSTING ENVIRONMENT

(71) Applicant: Gogrid, LLC, San Francisco, CA (US)

(72) Inventors: Justin M. Kitagawa, Lafayette, CA (US); Ryan E. Hobbs, San Ramon, CA (US); Lee F. Rosen, Alameda, CA (US); Daniel R. Sawyer, Pleasant Hill, CA (US); Jayson C. Vantuyl, Alameda, CA (US)

(73) Assignee: GoGrid, LLC, Jersey City, NJ (US)

( * ) Notice: Subject to any disclaimer, the term of this patent is extended or adjusted under 35 U.S.C. 154(b) by 188 days.

(21) Appl. No.: 13/907,832

(22) Filed: May 31, 2013

(51) Int. Cl.
*G06F 15/173* (2006.01)
*H04L 12/911* (2013.01)

(52) U.S. Cl.
CPC ..................................... *H04L 47/70* (2013.01)

(58) Field of Classification Search
CPC ................................ H04L 43/04; H04L 41/08

USPC ............................................................. 709/226
See application file for complete search history.

(56) References Cited

U.S. PATENT DOCUMENTS

| 8,352,608 | B1 * | 1/2013 | Keagy et al. ............. 709/226 |
| 2011/0307886 | A1 * | 12/2011 | Thanga et al. ................ 718/1 |

* cited by examiner

*Primary Examiner* — Ario Etienne
*Assistant Examiner* — Sahera Halim
(74) *Attorney, Agent, or Firm* — Sterne, Kessler, Goldstein & Fox PLLC

(57) ABSTRACT

Some embodiments provide a method of managing cloud resources on several of nodes of a hosting system. The method receives a cloud resource configuration. The method identifies a particular node from the several nodes to host the cloud resource configuration. The method sets an administrative state of the hosting system to reflect the hosting of the cloud resource configuration on the particular node. The administrative state includes information for each node in the hosting system. Each node includes a performer operating on the node that manages an operational state of the node based on the administrative state of the node.

20 Claims, 30 Drawing Sheets

Cloud Server - Resource Configurations — 405

| Resource | Type | OS Image | Hard Drive | Ram | ... |
|---|---|---|---|---|---|
| R1 | Web Server | Windows Server 2008 | 25 GB | 512 MB | ... |
| R2 | App Server | Windows Server 2012 | 200 GB | 4 GB | ... |
| R3 | Database Server | Red Hat Linux 5.6 | 800 GB | 24 GB | ... |

Dynamic Load Balancer - Cloud Resource Configurations — 410

| Resource | Load Balancer Algorithm | Persistence | ... |
|---|---|---|---|
| R4 | Algorithm A | None | ... |
| R5 | Algorithm C | IP Subnet | ... |
| R6 | Algorithm F | Session Cookie | ... |

Cloud Storage Shares - Resource Configurations — 415

| Resource | Storage | ... | ... |
|---|---|---|---|
| R7 | 1 TB | ... | ... |
| R8 | 500 TB | ... | ... |
| R9 | 1000 TB | ... | ... |

*Fig. 4*

SYSTEM AND METHOD FOR DISTRIBUTED MANAGEMENT OF CLOUD RESOURCES IN A HOSTING ENVIRONMENT

BACKGROUND

Hosting services provide a means whereby multiple users can implement custom cloud resource configurations (e.g., cloud servers, cloud storage shares, load balancers, etc.) without the overhead costs associated with purchasing, upgrading, and maintaining the equipment needed to implement the configuration. In some cases, a hosting service provider maintains and provisions a grid of hardware nodes that are shared amongst the multiple users. More specifically, resources of a single node can be partitioned and each of these partitions can be allocated to host a cloud resource configuration of a different user.

Virtualization provides the means for partitioning the hardware resources amongst the multiple cloud resource configurations. Virtualization creates the façade that each cloud resource configuration is individually hosted on dedicated equipment with a particular set of resources. Two or more cloud resource configurations are provided non-conflicting sets of resources of the same hardware node such that a guaranteed amount of processing resources is available to each such configuration. In other words, a single physical resource is partitioned to operate as multiple logical resources.

The hosting service must continuously manage each node in the grid of hardware nodes (and specialized virtual machines for certain types of cloud resources) to verify that the hardware node has been configured according to the user's intended cloud resource configurations. Each time a user modifies or updates a cloud resource configuration, the hosting service needs to implement the same modifications or updates on the particular hardware node that is hosting the cloud resource configuration. Certain hosting services implement a centralized management paradigm for managing the grid of hardware nodes. That is, the hosting service includes a single centralized module that is responsible for managing the entire grid of hardware nodes. Using a centralized management paradigm to manage all of the cloud resources presents various problems. The centralized management paradigm is unable to operate during various common system failures (e.g., network failures, hardware node failures, etc.). For example, when deploying a cloud resource on a particular node, a network failure may cause the centralized module to deploy several instantiations of the same cloud resources on the node. Furthermore, there may be various artifacts of partially configured cloud resources left on the node due to these failures which interfere with the complete deployment of the cloud resource on the node. Thus, there is a need in the art for a method of managing a grid of hardware nodes of a hosting system to consistently reflect the user's intended cloud resource configurations and to operate successfully even during a system failure situation. These failure scenarios can result in a mismatch of the user's intended configuration or "administrative state" (i.e., what the world should be) and the target resource's actual configuration or "operational state" (i.e., what the world is).

BRIEF SUMMARY

Some embodiments provide a hosting system for managing cloud resources associated with a grid of hardware nodes. Examples of such cloud resources include cloud servers (web-servers, database servers, application servers), cloud storage shares, load balancers, firewalls, network resources, etc. The system of some embodiments implements a model that decentralizes the management of the cloud resources and pushes the management responsibilities to the individual hardware nodes or cloud targets (e.g., specialized devices, virtual machines, or appliances used to configure certain types of cloud resources, including load balancer, network resources, and automated backup services). In a centralized management paradigm, a single centralized module is responsible for managing the physical resources on each hardware node in a grid of hardware nodes of the hosting system. In particular, the single centralized module communicates with each hardware node to actuate the commands to manage and assure that specific cloud resources match the user's intended cloud resource configurations (herein referred to as an "administrative state") that have been allocated to the node. Anytime a user updates the cloud resource configurations, the single centralized module has to communicate with each effected hardware node to deploy the modified configurations on the nodes. This produces a bottleneck at the centralized module since this module is solely responsible for executing potentially long lived, non-atomic processes to a target hardware node (or specialized virtual machine) at any given time.

In the decentralized management model, the resource management responsibilities of the individual hardware nodes are pushed onto the nodes. To facilitate such distributed management, the system includes a centralized director (or set of directors) that is primarily responsible for setting the user's intent (e.g., the "administrative state" of the hosting system) and for forwarding this user intent to various performers. Each performer operates on a particular hardware node of the hosting system. Furthermore, each performer is responsible for managing the cloud resources allocated to its hardware node. Each performer must continuously verify that the actual operational state of its hardware node matches the administrative state (e.g., user intent) set for that node. This includes verifying that the cloud resources currently operating on the node match the cloud resources that have been allocated to the node based on the administrative state of the node. This polling leads to eventual consistency in reconciling the user's intended administrative state to the target resources' actual operation state.

In some embodiments, the hosting system includes different types of directors, based on the particular type of cloud resource (e.g., cloud server, cloud storage shares, load balancer, etc.) being allocated. For example, the hosting system includes a "cloud server" director for tracking the administrative state of the cloud servers on the hosting system, a "load balancer" director for tracking the administrative state of the load balancers on the hosting system, and a "network" director for tracking the administrative state of the networking resources on the hosting system. Furthermore, each director type communicates with various performers of the same type in order to deploy the particular type of cloud resources across the hosting system. Thus a "cloud server" director communicates with various "cloud server" performers, a load-balancer director communicates with various load-balancer performers, a "network" director communicates with various network performers, etc.

The hosting system allocates user specified cloud resource configurations to different sets of resources on various hardware nodes of the hosting system. In some embodiments, certain types of cloud resources (e.g., load balancers, network resources, automated backup services, etc.) are allocated to specialized devices or virtual machines within the hosting system as opposed to a hardware node in a "grid of hardware nodes". For example, the load balancers of some embodiments are dedicated F5 load balancing server appliances that are independent of the grid of hardware nodes, while in other embodiments the load balancers are components within the grid of nodes. For explanation purposes, the detailed description generally refers to allocating cloud resources to hardware nodes in "a grid of hardware nodes". However, one of ordinary skill in the art will recognize that for certain types of cloud resources, a hardware node may correspond to a specialized device (e.g., a F5 load balancer appliance, a network switch), specialized virtual machine (e.g., a virtual load balancer appliance), etc.

In order to manage the overall resource allocations across the hardware nodes, the centralized set of directors each communicates with the various performers of the same type as the director, with each performer operating on a particular hardware node to manage the resources of the node. The performer on a particular node is responsible for configuring the resources of the node for hosting the cloud resources that have been allocated to the node. Furthermore, the director of the hosting system is responsible for tracking the administrative state of each node in the group of hardware nodes.

The administrative state provides the most up-to-date information regarding how each of the hardware nodes in the group of hardware nodes should be configured. In short, the administrative state reflects the hosting systems intended configuration of the cloud resources across the hardware nodes (i.e., what the world should be), which may be different from the actual "operational state" of each hardware node in the grid (i.e., what the world is). The administrative state also contains information regarding details of each cloud resource configuration (e.g., operating system configuration, RAM, storage capacity, CPU power, etc.) and information regarding the mapping of a particular cloud resource configuration to the particular hardware node(s) that has been designated for hosting the cloud resource configuration.

By using a director-performer architecture for managing the hardware nodes (and/or specialized virtual machines for certain types of cloud resources), the hosting system provides a distributed mechanism for efficiently managing the physical resources on each hardware node. In particular, the director is primarily responsible for tracking the administrative state of the hosting system. In turn, a performer operating on a particular hardware node is primarily responsible for retrieving the administrative state information for its node from the director and managing the physical resources on the node to match this administrative state. This leads to an eventual consistency in reconciling users' intended administrative state to the target resources' actual operational state.

In order to configure the physical resources of a particular hardware node to match the administrative state set for that node, the performer operating on the particular hardware node continuously or periodically queries the director in order to obtain the most up to date administrative information for the node. After receiving the administrative state information from the director, the performer then verifies that the current operational state of the particular node matches the administrative state for the node. For example, the administrative state may indicate that four web-server configurations have been allocated to a particular performer. That performer will then verify that four web-servers are actually operating in its hardware node. When the performer detects any discrepancies between the actual operational state of its node and the administrative state for the node, the performer will then modify and/or update the hardware resources on its node in order to match the administrative state set for the node. As another example, if only three web-servers have been configured on the node, then the performer will deploy an additional web-server that is configured according to the user's intended configuration, which is included as part of the information for the administrative state of the node.

The director manages the administrative state table to reflect the intended cloud resource configurations and mappings to various hardware nodes for all of the nodes in the group of hardware nodes. The director updates the administrative state table to reflect newly received cloud resource configurations and updates to existing cloud resource configurations. In particular, when a user modifies a cloud resource configuration, the director updates the administrative state table to reflect the modifications. Each performer continuously communicates with the director to verify that the operational state of its particular hardware node matches the administrative state for the node. In particular, each performer periodically queries the director asking for information regarding the administrative state of the particular node. As described above, each performer then verifies that the intended administrative state of the particular node matches the actual existing operational state of the node.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawing, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purpose of explanation, several embodiments of the invention are set forth in the following figures.

FIG. 4 conceptually illustrates an exemplary set of parameters that a user may configure for some of the different types of cloud resources of some embodiments.

DETAILED DESCRIPTION OF THE INVENTION

Figure 1:
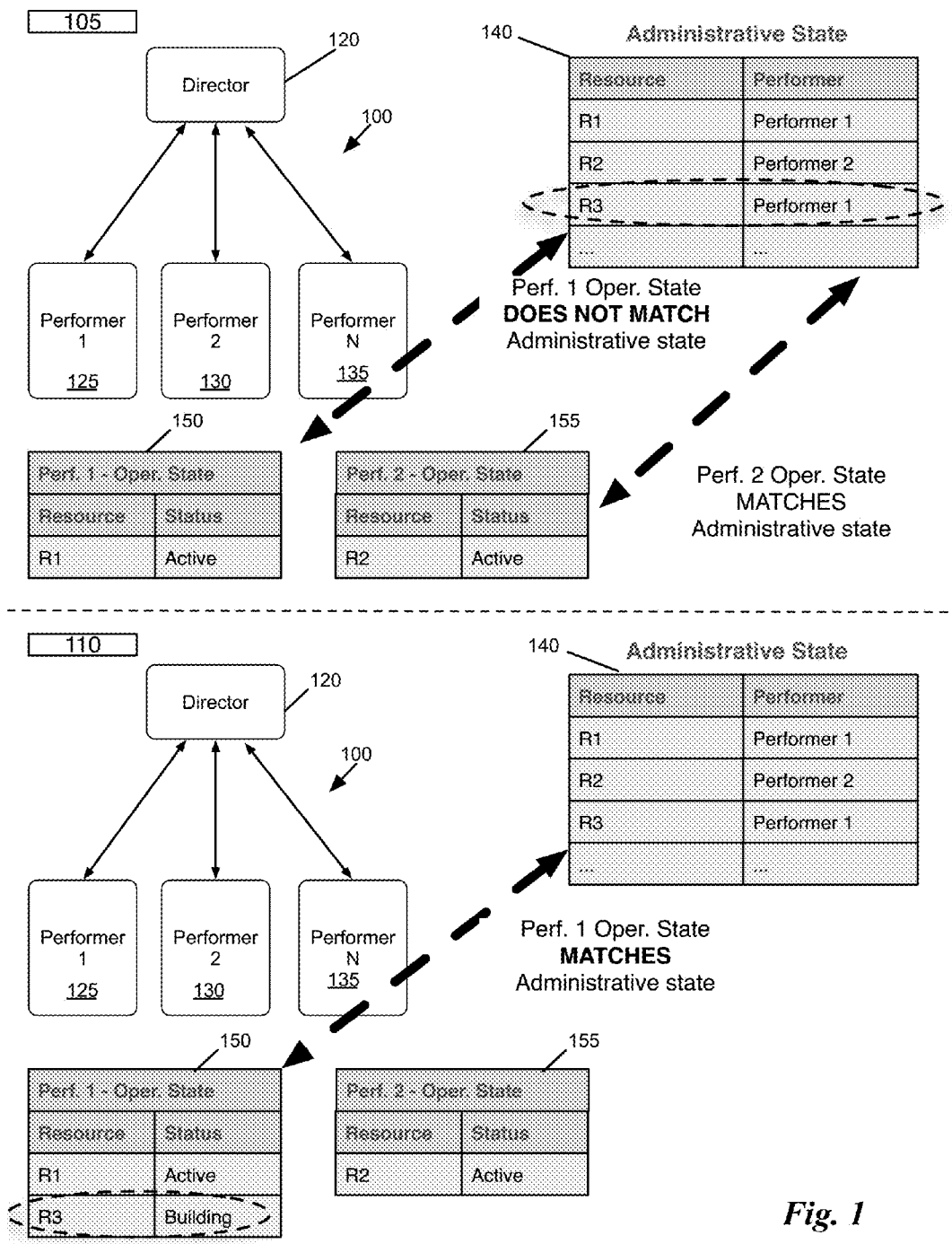
FIG. 1 conceptually illustrates an exemplary hosting system with a distributed resource management configuration of some embodiments.

In the following description, numerous details are set forth for the purpose of explanation. However, one of ordinary skill in the art will realize that the invention may be practiced without the use of these specific details. In other instances, well-known structures and devices are shown in block diagram form in order not to obscure the description of the invention with unnecessary detail.

Some embodiments provide a hosting system for managing cloud resources operating on various hardware nodes of the hosting system. Examples of such cloud resources include cloud servers (web-servers, database servers, application servers), cloud storage shares, load balancers, firewalls, network resources etc. In some embodiments, depending on the type of cloud resource being deployed, a hardware node refers to a specialized virtual machine for deploying the particular cloud resource. For example, load balancers, network resources, or an automated backup service may be deployed on specialized virtual machines rather than a hardware node in "a grid of hardware nodes". Furthermore, different types of cloud resources may be deployed on different types of specialized virtual machines within the hosting system.

The system of some embodiments implements a model that decentralizes the management of the cloud resources and pushes the management responsibilities to the individual hardware nodes or cloud targets. In previous centralized management paradigms, a single centralized module was responsible for managing the physical and logical resources on each hardware node in a grid of hardware nodes of the hosting system. In particular, the single centralized module would communicate with each hardware node to actuate the user's intended configuration for the node. Anytime a user updated their cloud resource configurations, the single centralized module would have to communicate with each effected hardware node to deploy the modified configurations on the nodes. This produces a bottleneck at the centralized module since this module is solely responsible for executing potentially long lived, non-atomic processes to a target hardware node (or specialized virtual machine) at any given time.

In the decentralized management model, the resource management responsibilities of the individual hardware nodes are pushed onto the nodes. To facilitate such distributed management, the system includes a centralized director (or set of directors) that is primarily responsible for setting the user's intent (herein referred to as an "administrative state" of the hosting system) and for forwarding this user's intent to various performers. Each performer operates on a particular hardware node in the grid of hardware nodes of the hosting system (or a specialized virtual machine for certain types of cloud resources such as a load balancer). Furthermore, each performer is responsible for managing the cloud resources allocated to its hardware node. Each performer must continuously verify that the actual operational state of its hardware node matches the administrative state (e.g., user intent) set for that node. This includes verifying that the cloud resources currently operating on the node match the cloud resources that have been allocated to the node based on the administrative state of the node.

In some embodiments, the hosting system includes different types of directors, based on the particular type of cloud resource (e.g., cloud server, cloud storage shares, load balancer, etc.) being allocated. For example, the hosting system includes a "cloud server" director for tracking the administrative state of the cloud servers on the hosting system, a "load balancer" director for tracking the administrative state of the load balancers on the hosting system, and a "network" director for tracking the administrative state of the network resources on the hosting system. In addition, one datacenter at a first location may have a different set of directors than another datacenter at a second location. Furthermore, each director type communicates with various performers of the same type (e.g., a load-balancer performer, a network performer, a cloud server performer, etc.) in order to deploy the particular type of cloud resources across the hosting system.

For some embodiment, FIG. 1 provides an illustrative example of such a hosting system with a distributed resource management configuration. Specifically, this figure illustrates in two operational stages 105-110 how the system 100 manages the cloud resources across a grid of hardware nodes. The hosting system 100 allocates user specified cloud resource configurations to different sets of resources on different hardware nodes. The user specified cloud resource configurations, as well as the particular hardware nodes that are to host the cloud resources, determine the "administrative state" of the hosting system. This administrative state of hosting system 100 is illustrated using an administrative state table 140 for illustrative purposes. The administrative state may be stored in other formats, and a table is simply provided for explanation purposes.

The administrative state table 140 stores the most up-to-date information regarding how each of the hardware nodes of the hosting system should be configured. In short, the administrative state table 140 reflects the hosting system's intended configuration of the cloud resources across the hardware nodes, which may be different from the actual "operational state" of each hardware nodes in the grid. The operational state is also illustrated as a table 150 and 155 for explanation purposes. However, the operational state may be stored in various different formats within the hosting system.

The "Resource" column of the administrative state table 140 provides the various cloud resource configurations that a user has configured for deployment on the hosting system. Each cloud resource configuration is labeled "R1-Rn" for explanation purposes. However, as described in more detail by reference to FIG. 4 below, each particular cloud resource configuration may specify various parameters applicable to the particular type of cloud resource being configured. For example, for a cloud server, the resource configuration may include a set of parameters that specify a particular data center location to host the cloud server (e.g., East Coast vs. West Coast), a cloud server type (e.g., web-server vs. application servers) a RAM size (e.g., 1 GB, 2 GB, etc.), an operating system image to use on the cloud server (e.g., Windows, Linux, etc.) among various other specifications.

The "Performer" column of administrative state table 140 indicates the corresponding performer 125-135 (operating on a particular individual hardware node) that has been designated for hosting the particular cloud resource configuration. As illustrated, the set of performers in hosting system 100 include performer 1 125, performer 2 130, performer N 135, etc.

The administrative state information within the administrative state table 140 is managed by a director 120 who is primarily responsible for tracking the administrative state of the hosting system 100. In particular, the director 120 updates the administrative state table 140 to reflect newly received user cloud resource configurations as well as updates to existing cloud resource configurations. In particular, when a user modifies a cloud resource configuration, the director 140 updates the administrative state table 140 to reflect these modifications.

Each performer 125-135 of the hosting system 100 operates on a particular individual hardware node to manage the resources of the node. In particular, a performer 125-135 on a particular node is responsible for configuring the resources of the node for hosting the cloud resources that have been allocated to the node. In order to configure the resources for a particular hardware node, a performer 125-135 operating on a node initially queries the director 120 and obtains the administrative state information for the node. The performer 125-135 then modifies the resources on the node to match the administrative state for the node. In order to match the administrative state, each performer 125-135 analyzes the operational state of its node (e.g., illustrated as operational state table 150 for performer 125 and operational state table 155 for performer 130), and modifies the hardware resources of the node when necessary in order to match the operational state with the intended administrative state for the node. In some embodiments, the performer leverages functionality provided by utility management modules, also referred to as utility virtual machines ("UVM"). In some embodiments, the utility management modules are virtual machines that locally reside on each node in the group of nodes. The utility management modules provide utility functions that assist the performer in automatically installing, configuring, and deleting cloud resources from the hardware node. In some embodiments, the utility functionality includes (1) automatedly instantiating custom cloud resource configurations onto the utility management module's corresponding node based on user-specified parameters within a particular cloud resource configuration, (2) automatedly modifying existing configurations by adding to or removing components of the existing configuration, (3) securely deleting cloud resource configurations, and (4) encrypting the cloud resources. In some embodiments, the performer communicates with one or more utility virtual machines or UVMs operating on the node to manage the configuration of the resources of the node, with each UVM responsible for a certain function such as deploying a cloud resource, saving a cloud resource, or deleting a cloud resource.

The operational state tables 150-155 include a column labeled "Resource" that includes each cloud resource that has been allocated on the node. The operational state tables 150-155 also include a column labeled "Status" that provides the current operational status of each of the various cloud resources on the node. In particular, operational state table 150 indicates that resource R1 is currently allocated on performer 1 125 and has an "active" operational status. Likewise, operational state table 155 indicates that resource R2 is currently allocated on performer 2 130 and has an "active" operational status as well.

By using a director-performer architecture, the hosting system 100 provides a distributed mechanism for managing the hardware resources across the group of hardware nodes. In particular, the director 120 is primarily responsible for managing information regarding the intended administrative state of the hosting system 100. Likewise, each performer 125-135 operating on a particular hardware node is primarily responsible for keeping the actual operational state of its hardware node configured according to the intended administrative state set for that node.

Each Performer 125-130 continuously modifies and updates its operational state 150-155 to match the administrative state 140 managed by the director 120. In some embodiments, a performer 125-135 periodically queries the director 120 for the performer's administrative state. In response, the director 120 retrieves the administrative state information for the particular performer 125-135 and sends this information to the performer. The performer 125-135 can then analyze this received information to determine whether its operational state matches the received administrative state or needs to be updated in order to match the administrative state. As such, the director 120 does not need to manage the step-by-step deployment of the cloud resources to the hardware nodes. This is particularly beneficial in situations where the system encounters different types of failures (e.g., network failure, director failure, hardware node failure). These failure situations are described below with reference to FIGS. 13-18.

Having described several example components of the hosting system, an example of how the system matches the administrative state set by the director with the operational state of each node will now be described with reference to FIG. 1. As illustrated in FIG. 1, in stage 105, the administrative state 140 indicates that resources R1 and R3 have been allocated to performer 1 125 and resource R2 has been allocated to performer 2 130. However, the operational state 150 of performer 1 125 indicates that only resource R1 is currently deployed on the node. Thus the operational state 150 of performer 1 125 does not match the administrative state 140 for performer 1 125. Since these states do not match, performer 1 125 needs to ensure that the hardware resources on its node matches the resources included in the administrative state 140 for performer 1. In particular, performer 1 125 must configure and build resource R3 on the hardware resources of its node.

The operational state 155 of performer 2 130 indicates that resource R2 is currently allocated on its node and has an "active" status. Likewise, the administrative state indicates that resource R2 is to be hosted on performer 2 130. Thus the operational state 155 of performer 2 130 matches the administrative state 140, and performer 2 130 does not need to modify the hardware resources on its node.

At stage 110, the operational state 150 for performer 1 125 now indicates that resource R3 has now been allocated to this hardware node. Furthermore, the operational state of resource R3, as provided by the operational state table 150, is "building," which indicates that performer 1 125 is currently in the process of configuring the hardware resources on its node in order to deploy cloud resource R3 on the node. Thus by this stage, each hardware node has an operational state that correctly matches the current administrative state of the hosting system. Furthermore, each performer 125-135 will continue to submit queries to the director 120 asking for their administrative state in order to detect and implement any updates that need to be made to the operational states of their respective nodes.

Several more detailed embodiments of the invention are described in the sections below. Section I provides further details regarding the director-performer architecture of the hosting system. Section II describes the process of deploying cloud resource configurations across the hardware nodes of the hosting system. Section III describes various director-performer operations, including how the hosting system is able to successfully operate during certain failure situations. Finally, Section IV describes a computer system which implements some embodiments of the invention.

I. Director-Performer Architecture

In the example described above, the hosting system is able to implement a distributed resource management paradigm by utilizing the director/performer architecture. In particular, the hosting system is able to distribute the management responsibilities of deploying a user's cloud resources to each of the individual nodes (or specialized virtual machines) that are to host a user's cloud resource configuration. The hosting system does this by having the administrative state of the hosting system managed by a single centralized director who is able to communicate with multiple performers, and having each performer responsible for keeping the actual operational state of its hardware node configured to match the intended administrative state set for that node (as set by the centralized director). Several examples of the director/performer architecture of such a hosting system are described below by reference to FIGS. 2-3.

A. Director-Performer System Architecture

Figure 2:
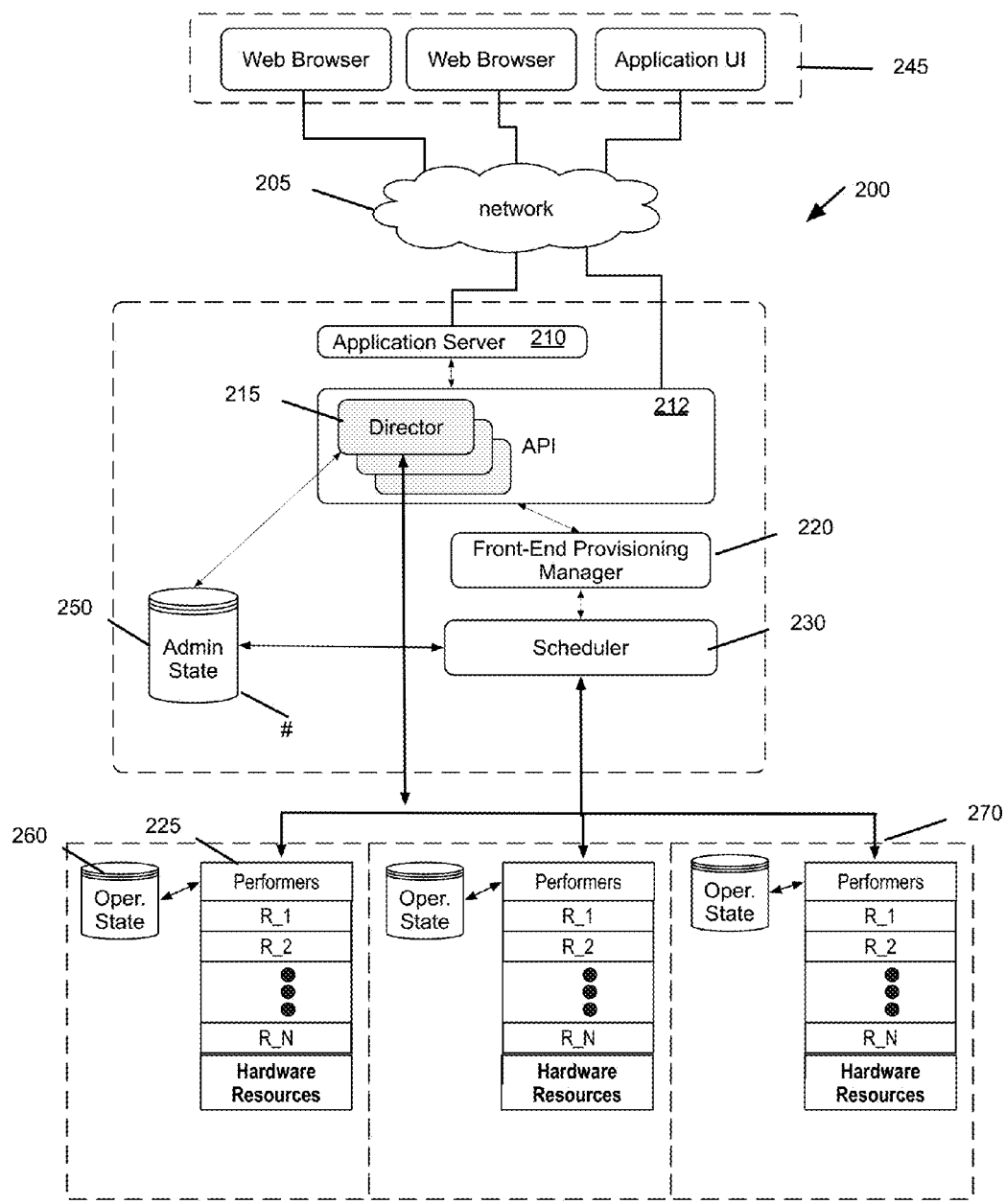
FIG. 2 conceptually illustrates a hosting system architecture that implements some embodiments of the invention.

FIG. 2 illustrates a hosting system 200 that implements some embodiments of the invention. The system receives cloud resource configurations in an automated fashion through front-end logic (e.g., through a user interface ("UI") and/or application programming interface ("API")) and deploys the cloud resource configurations onto a grid of hardware nodes (and specialized virtual machines) through automated back-end placement logic. In some embodiments, the hosting aspect of system 200 provides hosting services for multiple unrelated users over the shared grid of hardware nodes.

As shown in FIG. 2, the hosting system 200 includes (1) an application server 210, (2) an API 212 that includes a set of directors 215, (3) a front-end provisioning manager 220, (4) a scheduler 230, (5) an administrative state storage 215 and (8) a grid of hardware nodes 270.

The application server 210 (1) provides a user interface to external users through a network 205, (2) receives communications (e.g., service requests) from the external users through the network 205, and (3) routes the communications to the front-end provisioning manager 220 through the API 212. In some embodiments, a user accesses the hosting system 200 through a web browser, a downloadable client application, etc. 245 residing on the user's computer, personal digital assistant (PDA), smartphone, table, or other such electronic communication device. The network 205 may include a network of networks such as the Internet as well as other networks (e.g., GPRS, GSM, etc.). In this manner, users can access the hosting system 200 while located anywhere throughout the world.

In addition to communicating with the front-end provisioning manager 220 through the server 210, a user's device can communicate directly with the API 212 in some embodiments. Rather than selecting items in a user interface which are translated into commands by the application server 210, the user directly issues the commands through the network 205 to the API 212 (e.g., through a computer language agnostic HTTP-based API or command line interface). These commands are passed by the API 212 to the front-end provisioning manager 220.

As mentioned, the API 212 routes user communications to the front-end provisioning manager 220. On an initial communication, the front-end provisioning manager 220 passes the user communication to a registration module (not shown) for user verification and authentication (e.g., username and password verification). In some embodiments, the registration module is a fully automated component of the hosting system 200 that performs the verification and authentication operations without human intervention.

If the user is not an existing customer, the registration module of some embodiments presents a graphical interface with editable fields through which the user enters additional identification information for creating a user account. The user-specified information is then stored within a data storage of the system 200 for subsequent authentication and authorization of the user. If the user is an existing customer, the user's prior cloud resource configurations, usage information, and stored image information are retrieved from a data storage (i.e., database). The information is passed to the front-end provisioning manager 220.

The front-end provisioning manager 220 generates a user interface (e.g., a graphical user interface (GUI)) through which users specify the individual cloud resources for the total cloud resource configurations hosted by the hardware nodes in the grid 270. The user interface of some embodiments includes graphical representations of various types of cloud resources (e.g., load balancers, web servers, database servers, cloud storage shares, etc.) that each represents a component of the user's total cloud resource configuration. Users may utilize these graphical representations to add servers to a configuration or to modify the setup (e.g., the connections) of a particular configuration. In various embodiments, users can click on the representations (e.g., via left-click, right-click, double-click, etc.) within the user interface and/or drag and drop the representations within the graphical display in order to add, modify, delete, etc. resources within the configuration.

In some embodiments, the user interface also provides users the capability to modify the individual configuration of each of the cloud resources. Each cloud resource has one or more configurable parameters in some embodiments that are associated with configuring resources or characteristics of the cloud resource running on a physical hardware resource in the grid of nodes represented by the graphical representation. For example, users can modify the memory of a web server, the storage capacity of a database server, the algorithm to apply on a load balancer, etc.

Some embodiments of the front-end manager 220 further provide users the ability to specify custom configuration parameters for each cloud resource configuration or for the total cloud resource configurations as a whole. For instance, the front-end manager 220 of some embodiments provides users the ability to specify a desired software configuration (e.g., operating system, anti-virus protection, anti-spam protection, other applications, etc.) to operate in conjunction with the specified hardware configuration. In some embodiments, however, users are not allowed to specify particular software configurations or add software to an operational component through the user interface. Instead, once a component is operational, users can log in directly to the component to install software. In addition to the software configuration, some embodiments enable users to further specify configuration settings within the operating system of a cloud resource, such as entering network addresses for load balancers and firewalls or specifying hostnames for web servers.

The front-end manager 220 of some embodiments also specifies to a user a library of stored virtual server images that the user may deploy. In some embodiments, the images in this library include one or both of (1) public server images configured by any of the unrelated users of the hosting system and (2) private server images configured and stored by the user themselves. In addition to a library of such server images, the user interface of some embodiments provides users the capability to select any of the cloud resources running in the user's cloud resource configurations and store the cloud resources as a deployable cloud resource images.

As mentioned above, in addition to accessing the above functionality through a user interface, some embodiments enable a user to perform the same functions and access the same information directly through the API 212. Through a command line interface, the user can request information (e.g., the library of stored server images) which is provided by the API 212. The user can also specify components of a configuration, modify a configuration, specify configuration parameters, etc. directly through API 212. When the user accesses the functionality through the user interface, the application server 210 translates the user interface interactions into calls to the API 212 so that the same interaction with front-end provisioning manager 220 is achieved.

When a user has finished specifying the cloud resource configuration through the user interface or API, some embodiments of the front-end manager 220 automatically provide the configuration to a scheduler 230 module. In some embodiments, the scheduler module 230 receives a specified configuration from the front-end manager 220 and performs a logical assignment (i.e., identifies a mapping) of the individual cloud resources (e.g., virtual machines, web-server, database server, application server) within the configuration to the grid of hardware nodes 270. For instance, when a user specifies a virtual server image to deploy, the scheduler module 230 maps this virtual server to a hardware node. This logical assignment determines the administrative state of the hosting system, which is stored in the administrative data storage 250 in some embodiments so that it can be later accessed by the directors 215 of the hosting system 200.

The administrative state storage 250 stores the most up-to-date information regarding how each of the hardware nodes in the group of hardware nodes is to be configured. In particular, the administrative state storage 250 stores information regarding the hosting systems intended configuration of the cloud resources across the hardware nodes.

The director(s) 215 of the hosting system is primarily responsible for managing the information regarding the administrative state of the hosting system. The director 215 tracks the administrative state to accurately capture the user's intended cloud resource configurations as well as the mapping of the cloud resources to the individual hardware nodes (or specialized virtual machines) of the hosting system. The director 215 updates the administrative state to reflect newly received user resource configurations as well as updates to existing resource configurations. In particular, when a user modifies a resource configuration, the director 215 updates the administrative state information and stores the updated administrative state in the administrative state storage 250 to track the user modifications.

Figure 3:
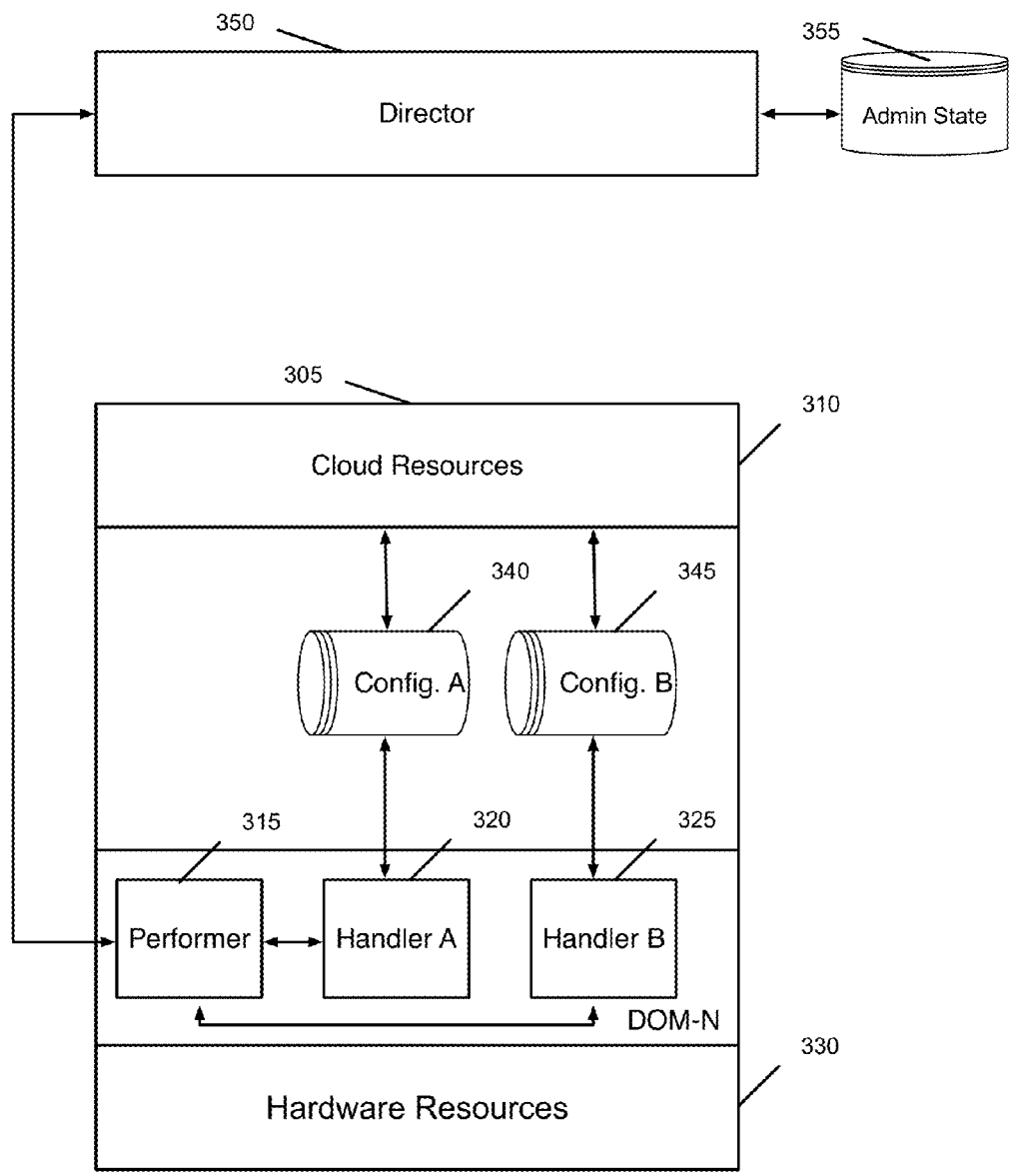
FIG. 3 conceptually illustrates an exemplary architecture of an individual hardware node and a performer operating on the node of some embodiments.

In some embodiments, a scheduler 230 automatically identifies the mapping of the cloud resources to the individual hardware nodes and deploys the resource configurations stored within the administrative state across one or more of the physical hardware nodes 270. The scheduler 230 identifies particular hardware resources within grid 270 on which to deploy the various cloud resources in a received configuration. In some embodiments, the scheduler communicates with the grid of hardware nodes 270 to determine the optimal hardware node for each cloud resource configuration. The scheduler 230 of some embodiments will virtualize one cloud resource across multiple different hardware nodes when applicable (e.g., when a database server requires a large disk space allocation, it may be distributed across multiple nodes). Each hardware node in the grid of hardware nodes 270 includes a set of performers 225 that manage the allocation of the resources of the particular hardware node to the various cloud resources allocated to on the node. Each performer 225 of a particular type sends a query to the director 215 of the same type within the hosting system asking for information regarding its administrative state. When the performer 225 receives its administrative state information, it compares it with the operational state of the hardware node. The operational state of the hardware node is stored in a local operational state data storage 260 on the node. In some embodiments, the operational state data storage 260 is a local cache storage on the node. The performer 225 determines whether the operational state of the node matches the administrative state set for the node. When the performer 225 determines that these states do not match, the performer 225 modifies the hardware resource allocations of the node in order match the operational state of the node with the administrative state. The performer 225 of some embodiments manages the deployment of a cloud resource on its node. In particular, the performer 225 oversees the partitioning, formatting, configuring, and modifying of the resources of its node for hosting the cloud resources. In some embodiments, the performer works in conjunction with one or more resource handlers to manage the resource configurations of the node. FIG. 3 provides details of the architecture of an individual hardware node and a performer operating on the node.

It should be apparent to one of ordinary skill in the art that the grid of hardware resources 270 of some embodiments includes several distinct physical servers or clusters of servers located in a single server farm or distributed across multiple server farms in multiple disparate locations. Accordingly, the grid of hardware nodes 270 represents a cloud of computing resources shareable by multiple users. In some embodiments, a hardware node may correspond to specialized virtual machines for deploying certain types of cloud resources. For example, a dynamic load balancer is deployed on a specialized virtual machine of the hosting system. One of ordinary skill will appreciate that servers in other embodiments encompass any standalone computational element that can process requests. In some embodiments, the grid of resources contains an inter-communication pathway by which each node shares data with other nodes of the array and the hosting system. Through this pathway, physically separated nodes can operate together as a single functional unit.

Additionally, as mentioned above, the various physical resources of each node can be logically partitioned and allocated to one or more cloud resources. For instance, each node in the grid of hardware resources 270 of some embodiments includes at least one physical processing unit, and through the various partitioning, allocation, and deployment operations performed by the scheduler, director, performer, and/or hypervisor, each physical processing unit is able to conceptually operate as multiple separate processing units for two or more cloud resources of the node. Other resources of a node (e.g., memory, disk space, network bandwidth, etc.) can also be logically split to be shared by multiple users.

It should be apparent to one of ordinary skill in the art that the architecture depicted in FIG. 2 does not encompass all embodiments of the invention. In some embodiments, the architecture may include other various functional components that work in conjunction with or instead of the enumerated components illustrated in FIG. 2.

B. Performer Architecture

As illustrated in FIG. 2, the hosting system may include different performers for different types of cloud resources, with each performer operating on a particular hardware node. FIG. 3 illustrates the architecture of a performer operating on a particular node 305 of the hosting system 300. As illustrated, the hardware node 305 includes various cloud resources 310 that have been allocated to the node. The hardware node 305 also includes a performer 315 that communicates with various handlers 320-325 in order to manage the hardware resources 330 of the node. In some embodiments, the performer 315 manages the hardware resources 330 of the node for deploying certain types of cloud resources (e.g., cloud servers) through a hypervisor of the node. The hypervisor maps the hardware resources 330 of the node to the cloud resources 310 that have been allocated to the node.

The performer 315 may operate within a particular "Dom-N" such as Dom0 (i.e., dom zero) through Dom-N. In some embodiments, Dom0 is the first domain or virtual machine started by the hypervisor on boot. Other virtual machines that execute one or more different guest operating systems and one or more applications in conjunction with the hypervisor are enumerated as Dom1 through DomN. Different types of performers may operate at different levels within the node. For example, a DLB-performer may operate in "DomU" for the node whereas a network-performer may operate in "Dom0" of the node.

The performer 315 is responsible for managing the hardware resources 330 of the node. In order to manage these resources, the performer 315 communicates with different handlers 320-325. The particular set of handlers 320-325 will be different for different types of performers. For example, a network performer may communicate with a firewall handler to configure IP tables, an L2-L3 handler that configures the hardware resources 330 of the node, and a dhcp handler to manage the dhcp configurations of the node. Likewise, a DLB-performer may communicate with a different set of modules and/or handlers in order to configure a load balancer. Furthermore, each handler 320-325 is responsible for configuring a certain aspect of the particular cloud resource and storing the configuration in the configuration data storages 340-345.

In order to obtain the configuration information for the node, the performer 315 periodically or continuously queries the director 350 asking for its administrative state. The director 350 retrieves the administrative state information for the particular hardware node 305 from the administrative state storage 355 and forwards this information to the performer 315. The performer 315 is then able to ensure that the operational state of the node 305 is configured according to the administrative state of the node 305.

C. Cloud Resource Configurations

Throughout this detailed description and the corresponding figures, each cloud resource configuration is illustrated as an "Rn". Each "Rn" may include various details of the different configuration parameters specified by the user for the particular cloud resource. Furthermore, different configuration parameters may be applicable to different types of cloud resources (e.g., cloud server, cloud storage shares, application server, web-server, load balancer, network firewall, etc.). The information that determines the administrative state of the hosting system will include all of the various configuration settings that have been specified by a user for their various cloud resources. Furthermore, the performer on a particular node will analyze this information regarding the administrative state of its hardware node, including the various configuration settings of the cloud resources that are to be hosted by its hardware node, when configuring the resources of its hardware node for hosting these cloud resource configurations. FIG. 4 illustrates some of the various parameters that a user may configure for some of the different types of cloud resources that may be deployed. In particular, FIG. 4 illustrates the parameters that may be configured for a cloud server, a dynamic load balancer and a cloud storage shares. The "Cloud Server—Resource Configurations" table 405 illustrates some of the user configurable parameters for customizing a cloud server. The "Dynamic Load Balancer—Cloud Resource Configurations" table 410 illustrates some of the user configurable parameters for customizing a dynamic load balancer. The "Cloud Storage Shares—Resource Configurations" table 415 illustrates some of the user configurable parameters for customizing cloud storage shares. Other types of cloud resources may define different sets of configuration parameters than those illustrated and these three examples are not intended to provide an exhaustive list for all of the different types of cloud resources and corresponding configurable parameters that may be deployed.

The cloud server table 405 includes various parameters that may be configured by a user for a cloud server. In some embodiments, as explained above, the user provides the cloud server configuration through a web-based user interface. The user may also provide the cloud server configuration through an API of the system. In this configuration, the user may set forth different configuration specifications. As illustrated in the example cloud server configurations table 405, the user may configure the "type", "OS Image", "CPU Cores", "Hard Drive", "RAM", and numerous other parameters that have not been illustrated in this figure. The "type" specifies the type of cloud server to deploy. The user may select from different types of cloud servers, including web-servers, application servers, database servers, etc. As illustrated, the user has specified resource R1 and R3 as web-servers and resource R2 as an application server.

The OS Image designates the operating system to deploy on the cloud server. The user may select from various available operating systems (e.g., Windows 2000, Windows 2003, Linux, Unix, etc.). As illustrated, resource R1 has been configured to use operating system "Windows Server 2008", resource R2 has been configured to use operating system "Windows Server 2012", and resource R3 has been configured to use operating system "Red Hat Linux 5.6".

The Hard Drive determines the amount of disk space storage that is allocated to the cloud server. As illustrated, resource R1 includes 25 GB, resource R2 includes 200 GB and resource R3 includes 800 GB. The RAM determines the amount of RAM memory to include on the cloud server. The user may select from different amounts of ram. As illustrated, resource R1 and R3 include 1 GB of RAM, and resource R2 includes 2 GB of Ram. Thus, when configuring a cloud server, a user may customize the various parameters illustrated in the cloud server table 405, among various other parameters that have not been included in the table. A cloud resource configuration "Rn" for this type of cloud resource (e.g., a cloud server) will then include these sets of configuration parameters as part of the cloud resource configuration information.

The "Dynamic Load Balancer—Cloud Resource Configurations" table 410 illustrates some of the various parameters that may be set by a user when configuring a dynamic load balancer. The set of parameters illustrated for the dynamic load balancer 410 are different from those illustrated for the cloud server 405 since certain parameters applicable to cloud servers are not applicable to load balancers and other parameters applicable to load balancers may not be relevant to cloud servers. As illustrated, the dynamic load balancer table 410 includes user configurable parameters for selecting the "Load Balancer Algorithm", "Persistence", and various other parameters that have not been illustrated in the table.

The "Load Balancer Algorithm" is the algorithm that the load balancer will use to distribute traffic to the virtual servers. The user may select the algorithm that is best suited for the type of traffic that is sent to the load balancer. As illustrated, the user has configured resource R4 to use "Algorithm A", resource R5 to use "Algorithm C" and resource R6 to use "Algorithm F". The table uses generic names for the various algorithms that may be configured for a load balancer. These algorithms could correspond to different weighted algorithms available by the hosting system. The load balancers of some embodiments are dedicated F5 load balancing server appliances that are independent of the set of hardware nodes, while in other embodiments the load balancers are components within the grid of nodes.

The "Persistence" may be set by a user if the user wants to send all requests in a session to the same virtual server. The user may set the persistence based on either destination or source addresses. As illustrated, the user has configured the persistence for resource R4 as "none", R5 as "IP Subnet", and R6 as "Session Cookie." None is the default option and will cause the selected algorithm to determine the routing. "Session Cookie" sets the persistence based on a destination address. "IP Subnet" sets the persistence based on a source address.

"Cloud Storage Shares—Resource Configurations" table 415 illustrates the various parameters that a user may customize when configuring cloud storage shares. The "Storage" designates the size of the storage. As illustrated, resource R7 has a storage capacity of 1 TB. Resource R8 has a storage capacity of 500 TB. Resource R9 has a storage capacity of 1000 TB. Tables 405-415 illustrates examples of different user cloud resource configurations "R1-R8" for three different types of cloud resources (e.g., cloud server, dynamic load balancer, and cloud storage shares). The information included in each of these cloud resource configurations determines the administrative state of the hosting system. As such, the administrative state of the hosting system includes information regarding many details of how each particular cloud resource is to be configured. Although many of the figures label each cloud resource configuration as simply an "Rn", as now described in FIG. 4, each "Rn" will include numerous configuration details and user specified parameters. As such, each performer of the hosting system will use this detailed information provided by the administrative state when managing and/or configuring the hardware resources on its hardware node (or specialized virtual machine for certain types of cloud resources) to match the administrative state of the node.

II. Initialization of Administrative State and Deploying Cloud Resources

Figure 5:
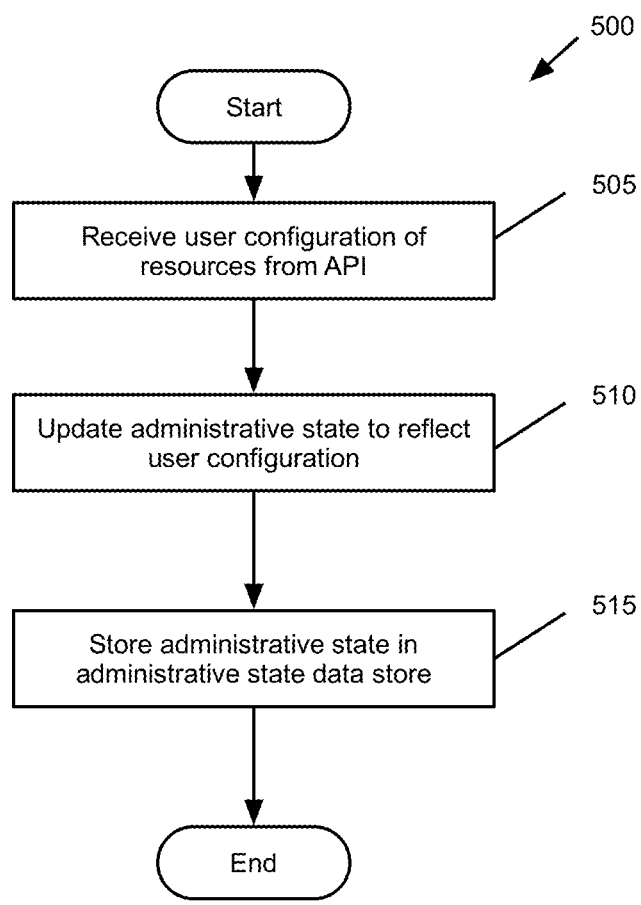
FIG. 5 conceptually illustrates a process of some embodiments used by the hosting system for managing the information regarding the administrative state of the hosting system.

The hosting system uses the administrative state to distribute the management responsibilities of the grid of hardware nodes (and specialized virtual machines) to individual performers operating on each individual node. The information that determines the administrative state of the hosting system includes the various cloud resource configurations specified by various users. The administrative state of the system also includes information regarding the individual hardware nodes (or sets of hardware nodes) that have been designated for hosting each particular cloud resource configuration. FIG. 5 illustrates a process of some embodiments used by the hosting system for managing the information regarding the administrative state of the hosting system.

The process initially receives (at 505) a user configuration of a cloud resource from an API interface of the system. In some embodiments, a user may configure their cloud resource configuration using a web-browser. In some embodiments, a user may configure their cloud resources directly using an API interface of the system. Each cloud resource configuration may define a configuration of a variety of different types of cloud services (e.g., a cloud server, a cloud storage share, a web-server, a database server, a load balancer, a network firewall, network resources, etc.).

Based on the type of cloud resource being configured, the process next (at 510) updates the administrative state to reflect the received user configuration of the cloud resource. This includes adding information to the administrative state for new resources that have been configured for the user.

Furthermore, the process updates the administrative state information for modifications that have been made to existing cloud resource configurations. The process (at 515) stores the administrative state in a data store of the system. In some embodiments, the administrative state is stored in a database. Regardless, the system manages the information within the administrative state in a manner that avoids having multiple different administrative states at different locations across the system. By storing the administrative state within a centralized storage of the system, the system can accurately capture the user's intended cloud resource configurations and how each of these cloud resources should be allocated across the hosting system. Each hardware node can in turn compare the administrative state information against the actual operational state of the node to determine how to allocate the resources on the node.

Figure 6:
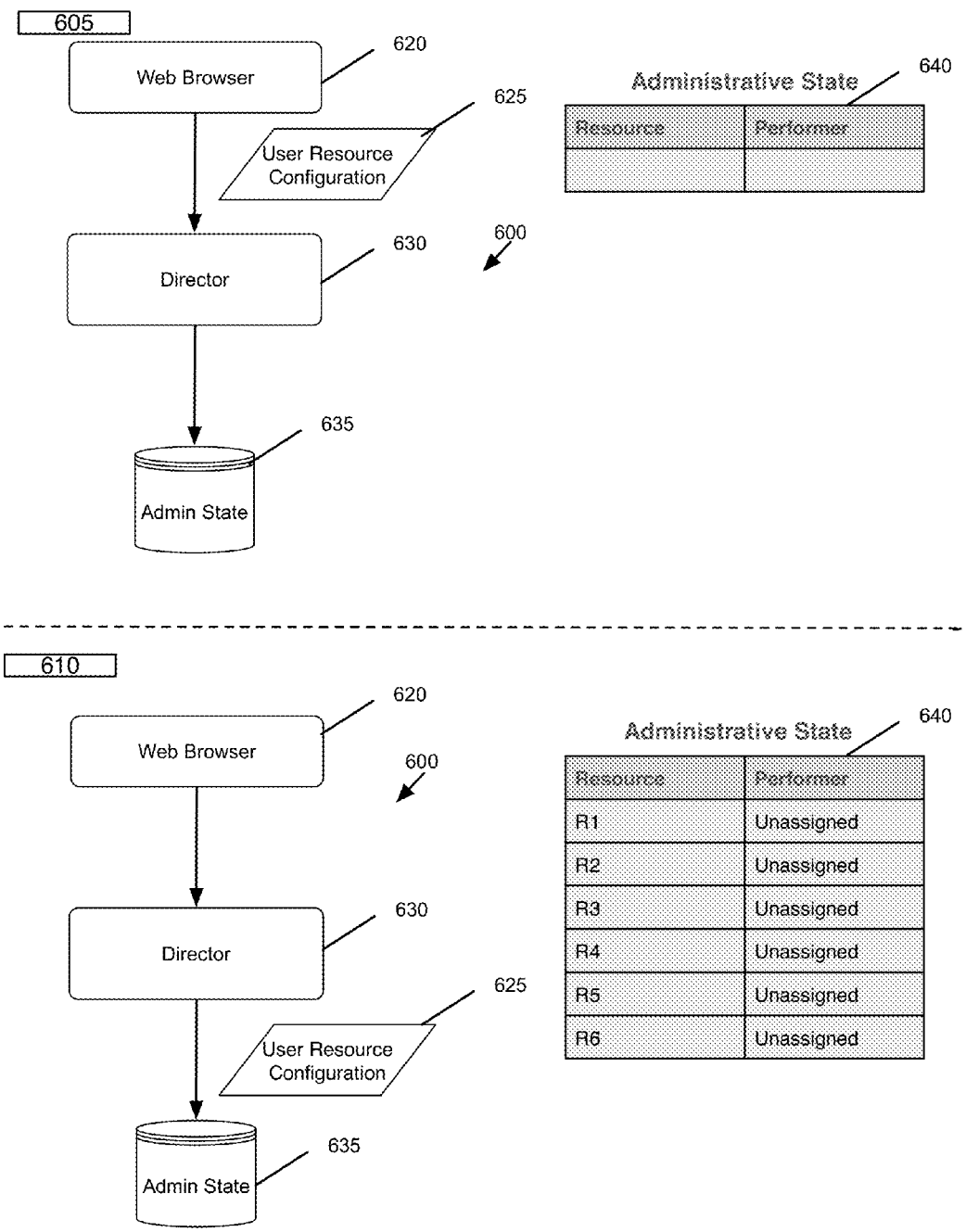
FIG. 6 conceptually illustrates the initialization of the administrative state of the hosting system after receiving a user's cloud resource configuration of some embodiments.

FIG. 6 illustrates the initialization of the administrative state of the hosting system after receiving a user's cloud resource configuration. In particular, hosting system 600 illustrates a web-browser 620, a director 630, and an administrative state storage 640. In stage 605, the director 630 is receiving a user's cloud resource configuration 625 from the web browser 620 of the user. As illustrated, the current administrative state 640 does not include any information regarding any cloud resources allocated across the hosting system. For illustrative purposes, FIG. 6, shows three nodes that have not been assigned to any hardware node. To simplify the discussion, the administrative state is initially shown as being empty but can include many states.

Figure 7:
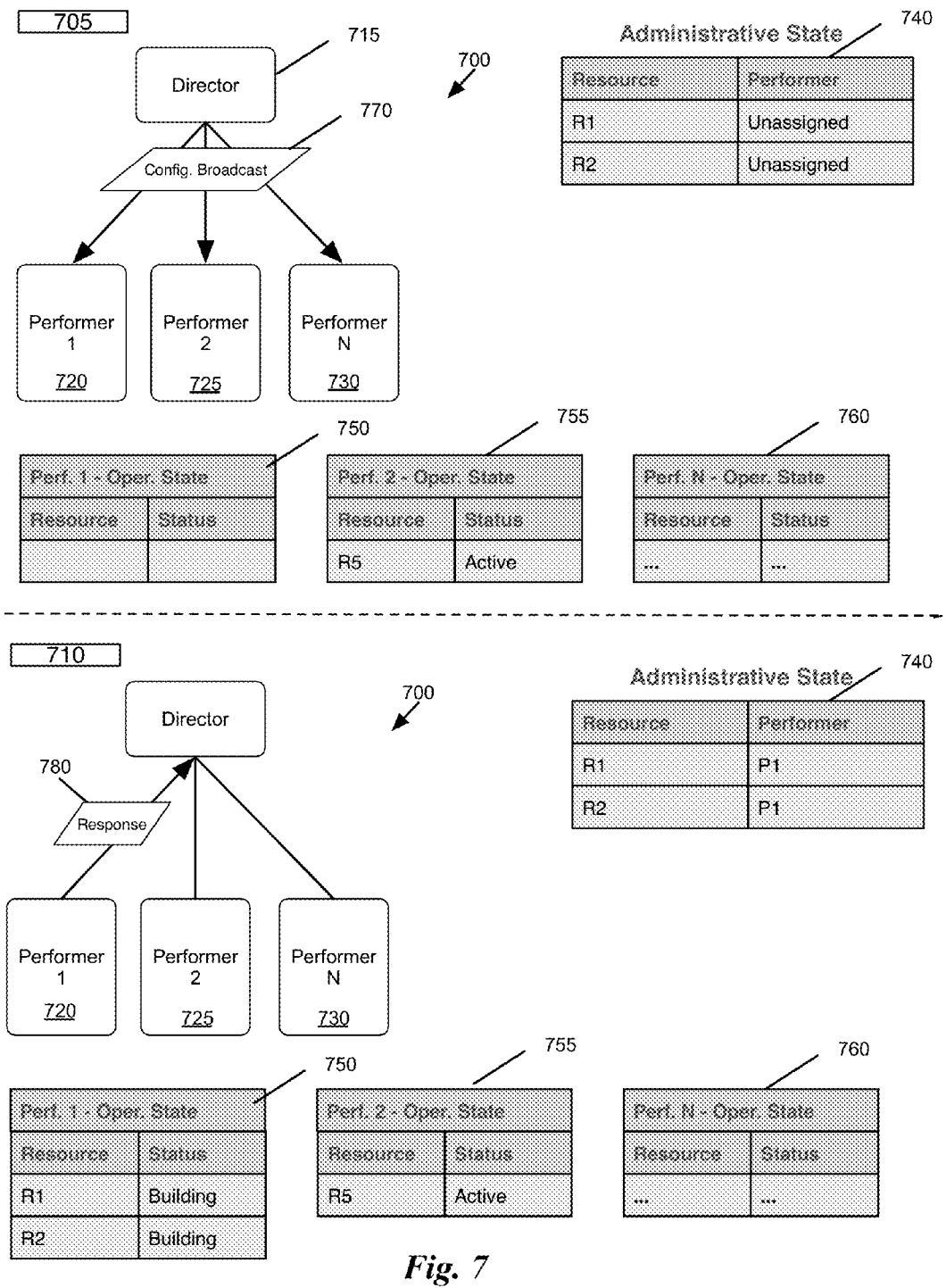
FIG. 7 conceptually illustrates a director sending a configuration broadcast of a cloud resource to all of the nodes for deploying cloud resources in some embodiments.

Stage 610 illustrates that the director 630 has now received the user's cloud resource configuration 625 and is in the process of storing the information within the administrative state data storage 635 (e.g., data store or database) of the system 600. The director has also set certain information for the administrative state of the hosting system, which is illustrated in the administrative state table 640. In particular, the director 630 has populated the administrative state 640 with information based on the various cloud resource configurations that were included within the user's cloud resource configuration data 625. The "Resource" column of administrative state table 640 indicates that the user is intending to allocate six different cloud resources, R1-R6 that are to be hosted on by the hosting system 600. The "Performer" column of the administrative state table 640 indicates that each of the six cloud resources has not yet been assigned to a particular performer. As such, the hosting system must now determine the mapping of the cloud resources to the various hardware nodes of the hosting system. FIGS. 7-8 illustrate different mechanisms for deploying the cloud resources across the hardware nodes.

The administrative state of the hosting system not only includes information regarding the cloud resource configurations of the user, but also information regarding how each of the various cloud resources has been deployed across the hardware nodes. In particular, the administrative state includes information regarding the particular performer (and corresponding individual hardware node or sets of hardware nodes) that has been designated by the hosting system for hosting the particular cloud resource configuration. FIG. 7 illustrates one possible manner in which the hosting system allocates the cloud resources to the individual nodes (or specialized virtual machines for certain types of cloud resources). In particular, FIG. 7 illustrates a director sending a configuration broadcast of a cloud resource to all of the nodes and assigning the cloud resource to the first node that responds to the configuration broadcast.

FIG. 7 illustrates in two stages 705-710 the hosting system 700 allocating cloud resources to different hardware nodes of the system. Hosting system 700 includes a director 715 that is communicating with several different performers 720-730. Each performer 720-730 is operating on a particular hardware node (not illustrated) and manages the resources of the node. The administrative state of the hosting system 700 is illustrated by the administrative state table 740. The actual operational state of each performer is illustrated by the operational state tables 750-760. Operational state table 750 provides the operational state of performer 1 720, operational state table 755 provides the operational state of performer 2 725. Operational state table 760 provides the operational state of performer N 730, which has been labeled "N" to indicate that different numbers of performers will exist for different hosting systems.

At stage 705, the administrative state table 740 of the hosting system 700 indicates that resources R1 and R2 are "unassigned" and thus have not yet been deployed to any of the hardware nodes of the system. Furthermore, director 715 is sending a configuration broadcast 770 to each of the various performers 720-730. The configuration broadcast 770 includes information about each of the various cloud resources that need to be deployed onto the hosting system. In some embodiments, the director 770 broadcasts this information to all of the hardware nodes so that each hardware node can determine whether or not it has the capacity to host a particular cloud resource configuration. In some embodiments, when a particular hardware node receives a notification of a cloud resource that needs to be hosted, the node analyzes its current operational state, available resources, and other factors to determine whether or not it is able to host the particular cloud resource configuration. In some embodiments, each hardware node analyzes the particular cloud resource configuration to determine whether the resources available on the particular hardware node are compatible with the particular cloud resource configuration. For example, a node may compare the type of hypervisor running on the node with a hypervisor type required for the cloud resource. The particular set of factors will vary with each of the different resource types, but may include analyzing the compatibility of operating systems, file systems, networking protocols, data storage requirements, RAM capacities, networking bandwidth, and numerous other considerations.

After a particular hardware node has determined that it is able to host a particular cloud resource configuration, it notifies the director 715. Stage 710 illustrates that performer 1 720 is sending a response 780 to the director 715 to indicate that it is available to host the cloud resource configuration. The director 715 allocates the resource to the first node that responds to the configuration broadcast sent in stage 705. As such, the director 715 has updated the administrative state table 740 of the hosting system to identify performer 1 720 as the hardware node that is to host resources R1 and R2 since performer 1 720 was the first node to respond to the configuration broadcast. Furthermore, the operational state table 750 for performer 1 720 now indicates that resources R1 and R2 are being built on this hardware node.

Figure 8A:
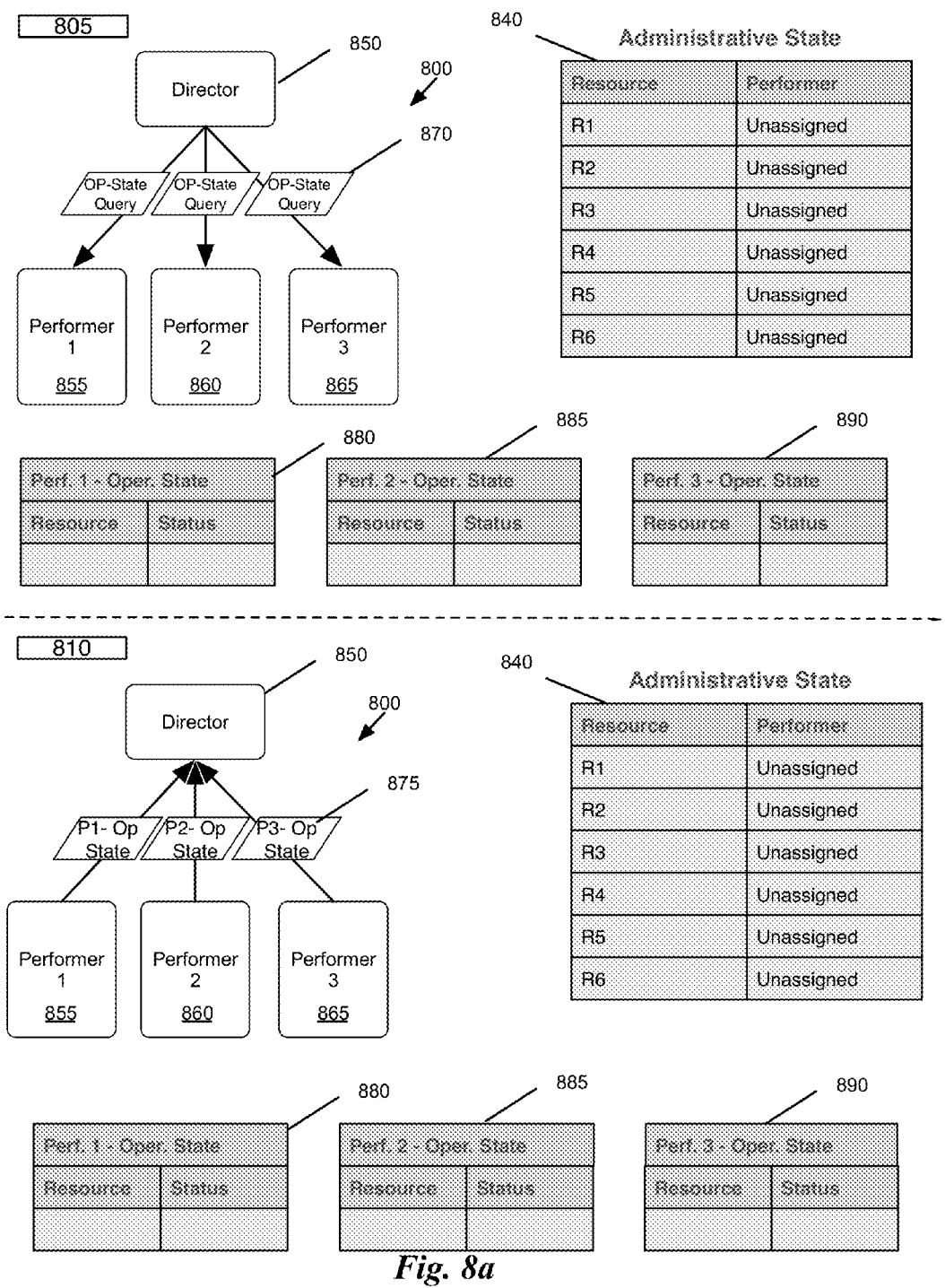
FIG. 8a conceptually illustrate a director managed deployment of cloud resources of some embodiments of the invention.
Figure 8B:
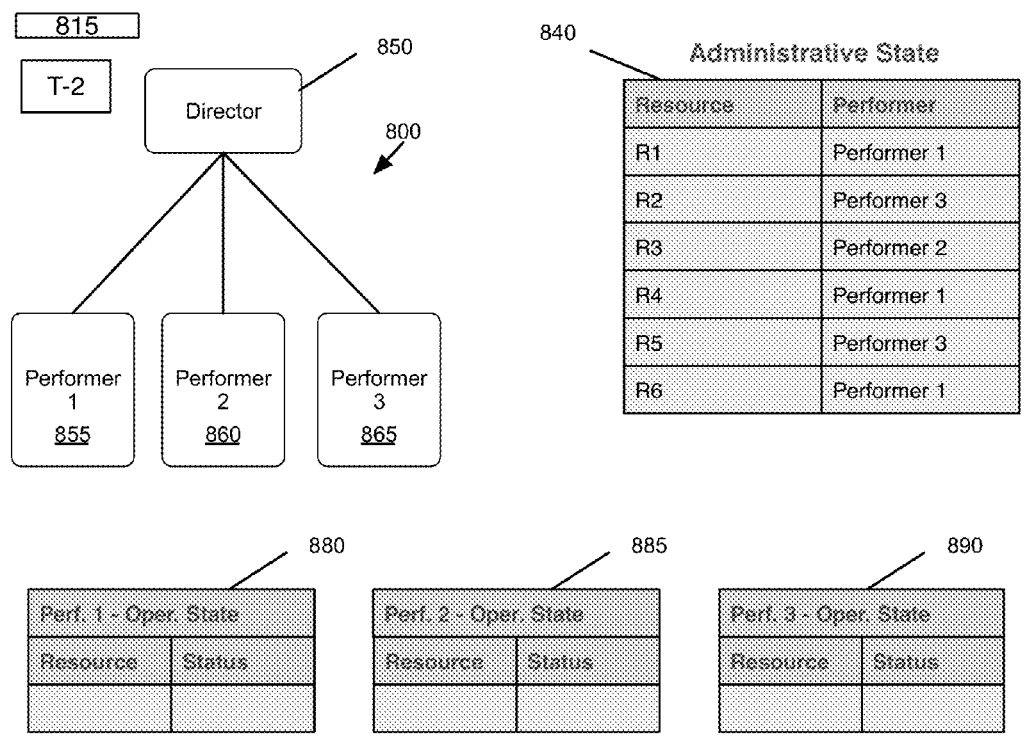
FIG. 8b conceptually illustrate a director managed deployment of cloud resources of some embodiments of the invention.

FIG. 7 illustrates one embodiment for deploying cloud resources across the hardware nodes of the hosting system. In another possible embodiment, the director analyzes each of the different hardware nodes to determine the particular hardware node on which to deploy a particular cloud resource. FIGS. 8a-8b illustrate a director managed deployment of cloud resources. In particular, FIGS. 8a-8b illustrate in three stages 805-815 a director managing the resource allocation of several cloud resources to different hardware nodes of the hosting system 800. In particular, hosting system 800 has already received a set of user configurations for different cloud resources that are to be hosted across the hosting system. Each cloud resource has been stored within the administrative state of the hosting system, illustrated as the administrative state table 840. The "Resource" column of the administrative state table 840 indicates that six cloud resources, R1-R6, have been received from users of the hosting system. The "Performer" column of the administrative state table 840 indicates that each of these resources, R1-R6, has not yet been assigned to a particular hardware node on the hosting system. As such, the director 850 is sending an operational state query 870 to each performer 855-865 of the hosting system 800 asking for the current operational state of the performer. In some embodiments, each performer 855-865 may periodically push or send its operational state information to the director 850 without first receiving a query from the director.

Stage 810 illustrates each performer 855-865 sending its operational state data 875 to the director 850. The operational state data 875 for each performer 855-865 may include information regarding the current cloud resources operating on the hardware resources of the particular performer. Furthermore, the operational state information of a node may include information regarding the available hardware resource on the node, the processing power of the node, the network bandwidth and capacity of the node, etc. As illustrated in the operational state tables 880-890 for each of the performers 855-865, each node currently has no cloud resources deployed on the node. Thus each performer 855 has not yet deployed any cloud resources on its node.

State 815 of FIG. 8b illustrates the director 850 has now updated the administrative state of the hosting system to reflect the hardware nodes that are to host the various cloud resources. In particular, the director 850 has updated the administrative state table 840 to indicate which of the various performers 855-865 have been designated for hosting each of the cloud resources R1-R6. Administrative state table 840 indicates that resources R1, R4 and R6 are to be deployed on Performer 1 855, resource R2 and R5 are to be deployed on Performer 3 865, and resource R3 is to be deployed on Performer 2 860. The hosting system 800 may apply a variety of algorithms for selecting the various hardware nodes that are to host the different cloud resource configurations. These algorithms examine a variety of factors, including the available amount of resources on the node, the type of the resources, the location of the resources, among various other factors. Once the director sets the administrative state, each performer 855-866 can now ask the director for its particular administrative state in order to configure the cloud resources that need to be deployed on the particular node of the performer.

III. Director-Performer Operations

Figure 9:
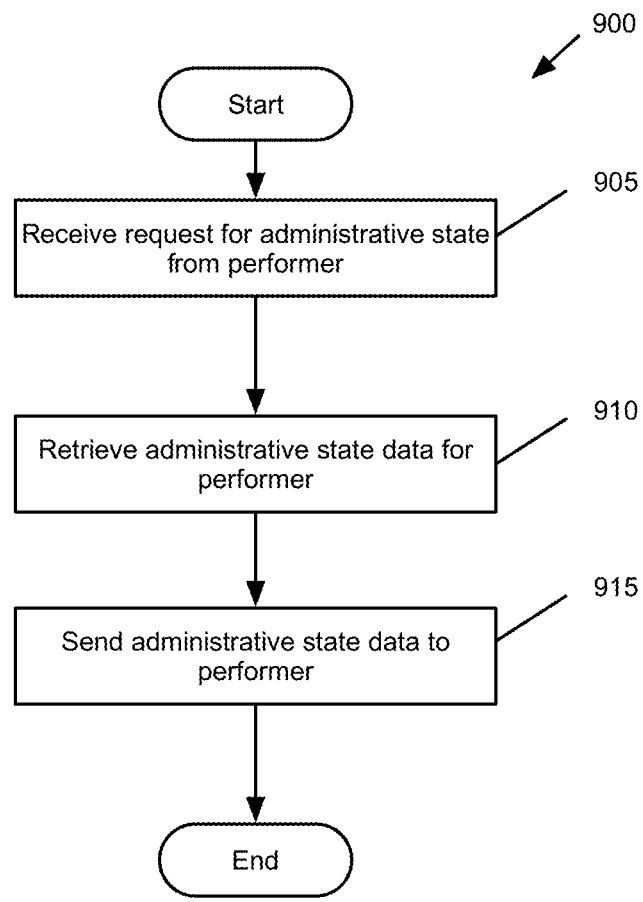
FIG. 9 conceptually illustrates a process for deploying and managing the cloud resources across the hardware nodes of the system from the director's perspective of some embodiments of the invention.
Figure 10:
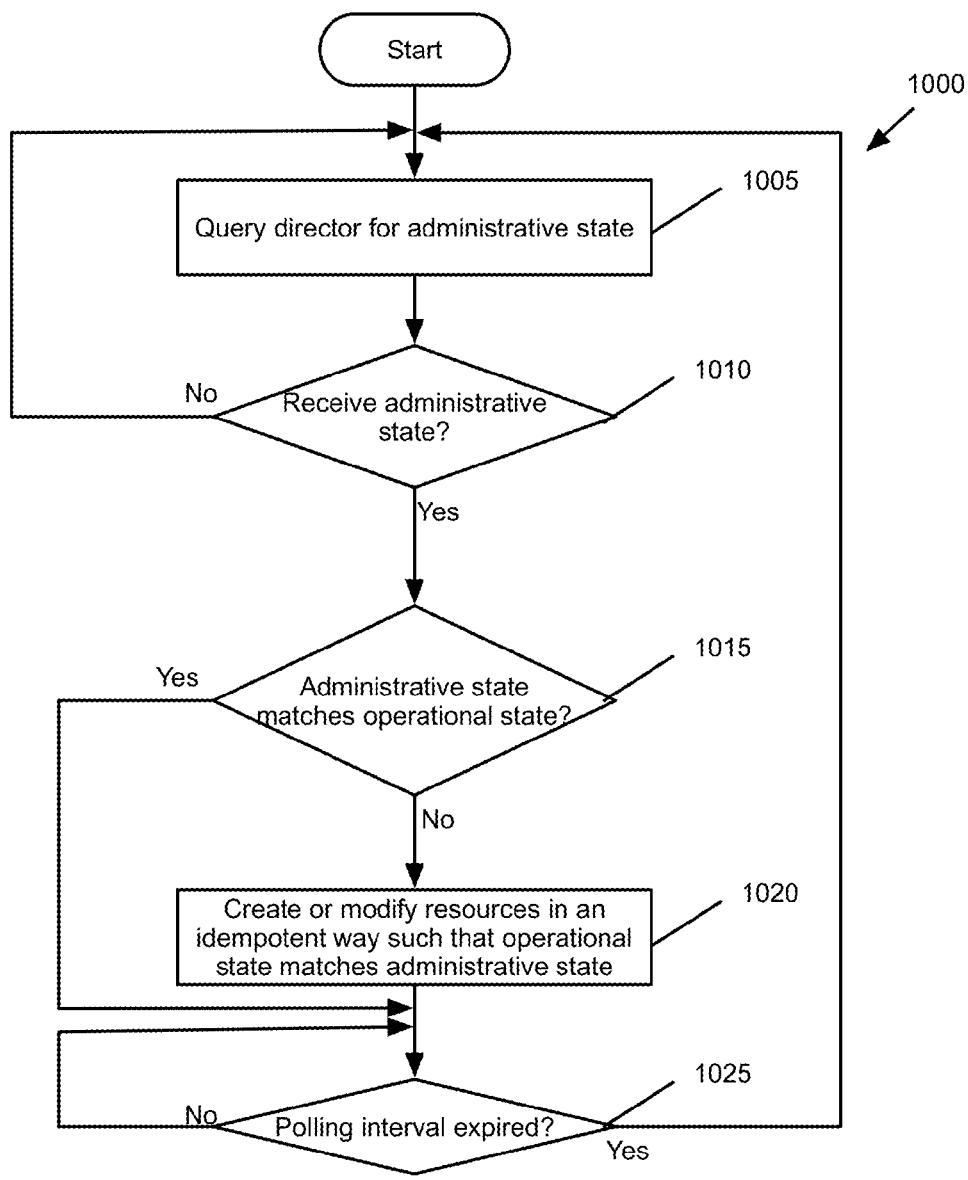
FIG. 10 conceptually illustrates a process for deploying and managing the cloud resources across the hardware nodes of the system from the performer's perspective of some embodiments.

The director-performer architecture of the hosting system distributes of the management responsibilities of the hardware resources of the hosting system between a single director and numerous performers operating on individual hardware nodes in the hosting system. The director sets the administrative state of the hosting system and each performer continuously communicates with the director to obtain the administrative state information for its particular hardware node. In some embodiments, the performer directly accesses the administrative state information of the hosting system. Each performer is then responsible for managing/configuring the hardware resources of its hardware node to match the administrative state set for the node. FIGS. 9-10 each illustrate a process for deploying and managing the cloud resources across the hardware nodes of the system. In particular, FIG. 9 illustrates the process from the director's perspective while FIG. 10 illustrates the process from a particular performer's perspective.

As illustrated in FIG. 9, the process 900 initially receives (at 905) a query request from a performer asking for information regarding its administrative state. In some embodiments, the request is received by a centralized director of the hosting system. Each performer continuously sends periodic requests to the director for information regarding its administrative state in order to receive any updates that may have been made to the administrative state.

The process then retrieves (at 910) the administrative state information for the particular performer that has requested the information. The administrative state information will include the cloud resources that have been allocated to that performer by the hosting system, including the configuration details of these cloud resources (e.g., for VMs these will be RAM, memory, networking setting, operating system image, etc.). After the process retrieves the administrative settings for the particular performer, the process (at 915) sends this administrative state information to the particular performer that initially requested the data. In some embodiments, the process sends only the administrative state information that is relevant to the particular performer. For example, the process may send information related to only those resources that have been allocated to the particular performer. In some embodiments, the process sends the entire totality of the administrative state information to the performer, including information regarding cloud resources that have been allocated to other performers on other hardware nodes. Each performer can than verify and/or update the actual operational state of its hardware resources in order to match the retrieved administrative state of the node.

FIG. 10 illustrates a performer's perspective of the process 1000 of managing its hardware node. The process 1000 is performed by each individual performer operating on each of the different hardware nodes. Different performers may perform the process at different times. The process 1000 initially (at 1005) sends a query to a director asking for the administrative state of the particular hardware node. The query may include certain information to identify the particular performer from the set of performers that is submitting the query to the director. The process next determines (at 1010) whether or not it has received its administrative state from the director. If the process has not received the administrative state information, the process iterates back to stage 1005 to re-submit a query to the director. This may occur when, for instance, the hosting system encounters a network failure, a failure of the director, or various other circumstances that may prevent a performer from receiving its administrative state information.

When the process determines (at 1010) that it has received its administrative state information, the process next determines (at 1015) whether the administrative state information matches the operational state of the node. In particular, the process examines the actual operational status of the various cloud resources executing on the node and compares them with the intended administrative state of the node. For example, if the administrative state indicates that a cloud server is set to execute on this node, the performer will verify that an actual cloud server is executing on the node.

When the operational state matches the administrative state, the process waits (at 1025) until a polling time interval has expired to again query the director (at 1005) for the administrative state. If the process determines that the operational state does not match (at 1015) the administrative state of the node, the process (at 1020) creates and/or modifies the resources on the node, in an idempotent manner, in order to have the operational state match the administrative state for the node. Once the administrative state matches the operational state, the process waits (at 1025) until a particular polling time period has expired before re-querying the director again for the administrative state information. The process continuously queries the director for the administrative state to ensure that the actual operational state of the node matches the administrative state of the node, and any updates that have been made by the director to the administrative state are effectuated by the actual operational state of the node.

A. Matching Operational State with Administrative State

Figure 11A:
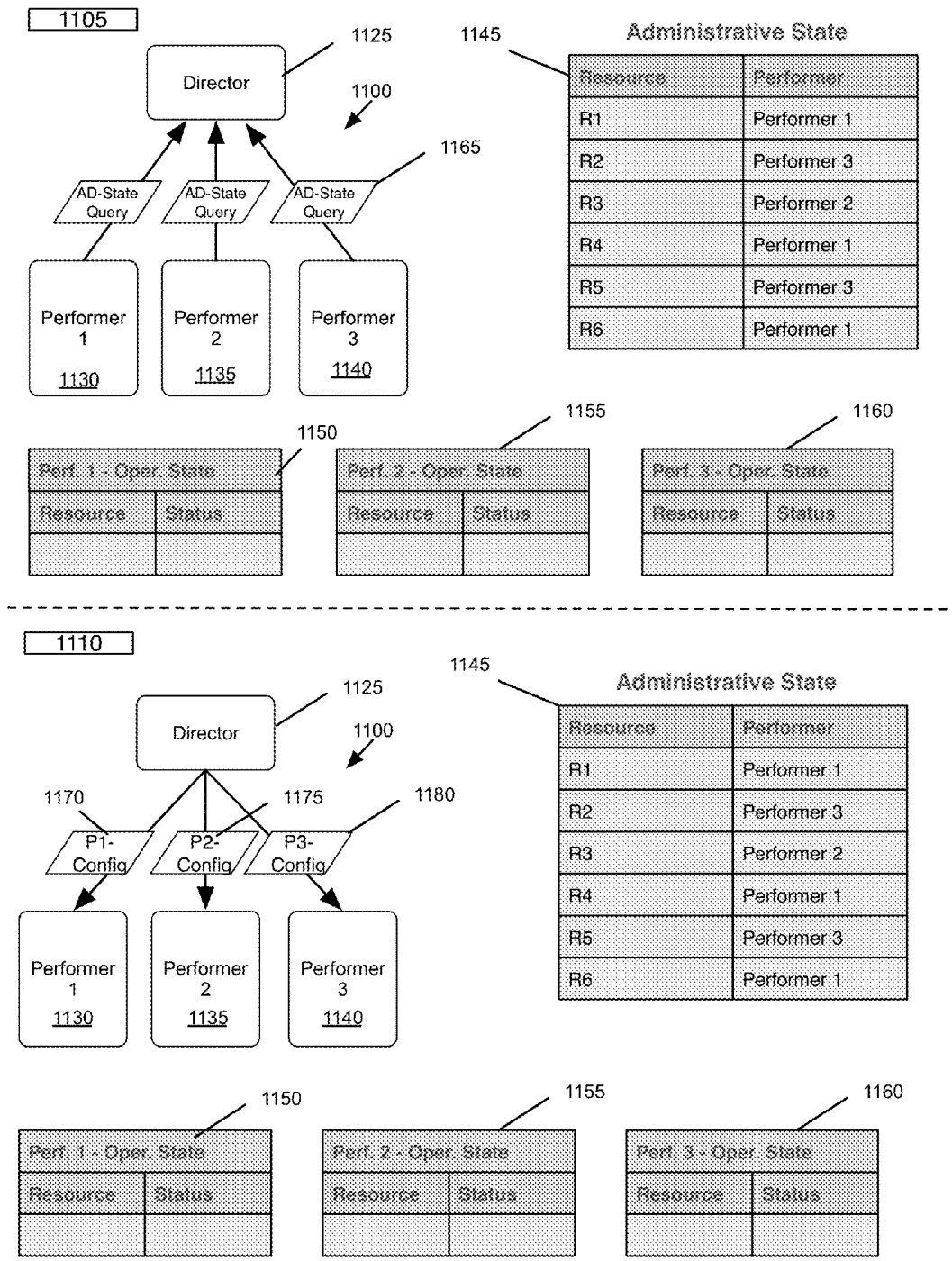
FIG. 11a conceptually illustrates the communication between the director and various performers in order to deploy a user's cloud resources on the nodes of the performers in some embodiments.
Figure 11B:
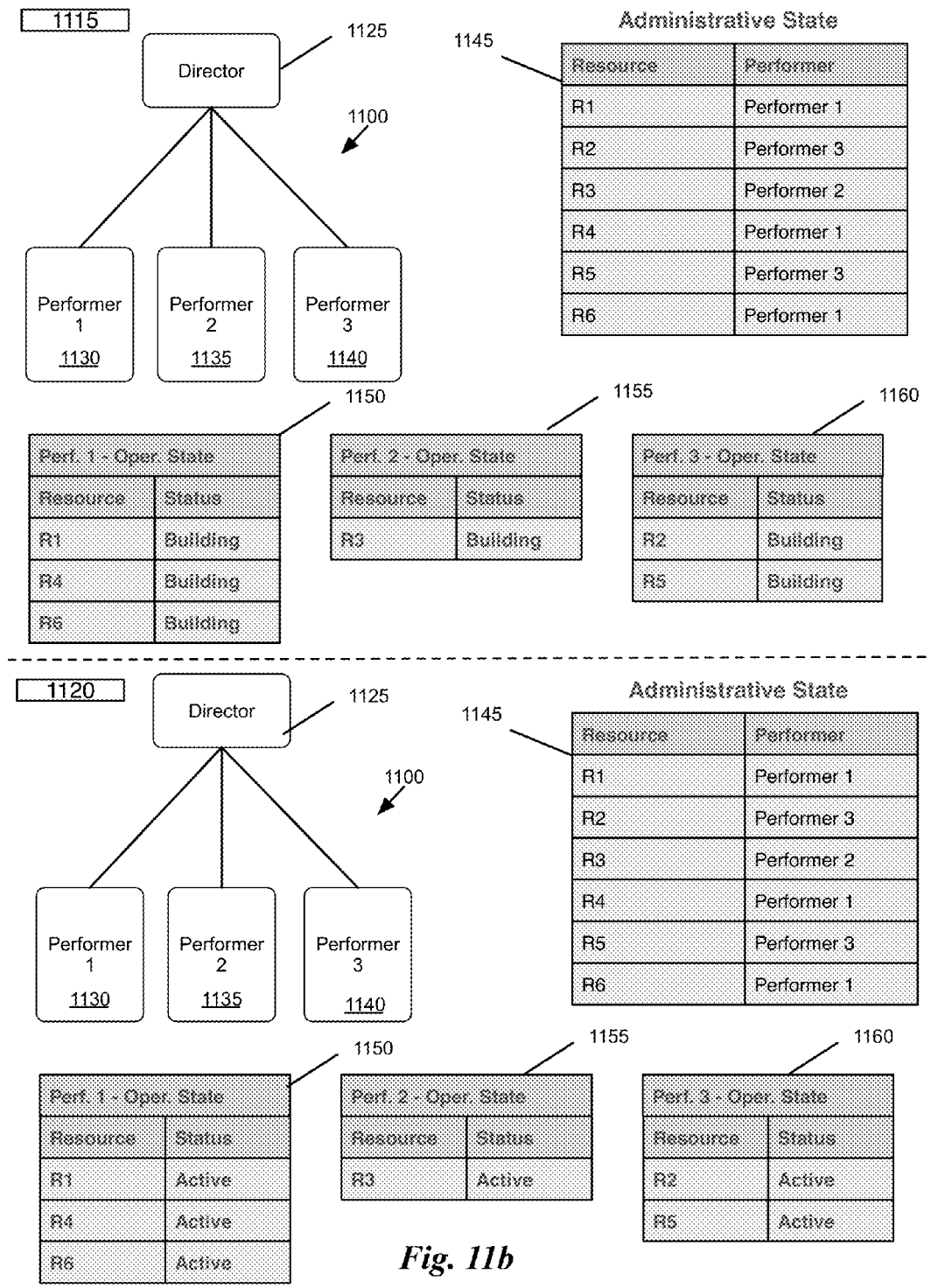
FIG. 11b conceptually illustrates the communication between the director and various performers in order to deploy a user's cloud resources on the nodes of the performers in some embodiments.

Each performer of a particular type (e.g., network, load balancer, cloud server, etc.) continuously communicates with the director of the same type to verify that the operational state of the hardware node managed by the performer matches the administrative state of that node, as set by the director. FIGS. 11*a-b* illustrate in four stages 1105-1120 the communication between the director and various performers in order to deploy a user's cloud resources on the nodes of the performers. Each stage illustrates the hosting system 1100, which includes a director 1125 of a particular type and several performers 1130-1140 of the same type. Furthermore, each stage 1105-1120 provides the administrative state of the hosting system 1100 as illustrated using an administrative state table 1145 as well as the operational states of the various performers using operational state tables 1150-1160. In particular, operational state table 1150 provides the operational state of performer 1 1130, operational state table 1155 provides the operational state of performer 2 1135 and operational state table 1160 provides the operational state of performer 3 1140.

The first stage 1105 corresponds to a "time: 0" of the hosting system. At this particular time, the administrative state of the hosting system, as shown by the "Resource" column of the administrative state table 1145, indicates that six cloud resources, R1-R6, have been configured for hosting on the hosting system. In particular, the "Performer" column of administrative state table 1145 indicates that resources R1, R4 and R6 are to be hosted on the hardware node managed by performer 1 1130, resource R3 is to be hosted on the hardware node managed by performer 2 1135, and resource R2 and R5 are to be hosted on the hardware node managed by performer 3 1140. As described above, the hosting system applies various mechanisms for selecting and allocating each cloud resource to the various different performers.

Furthermore, in stage 1105, the operational state of each of the performers 1130-1140, as illustrated by operational state tables 1150-1160, indicates that no cloud resources have yet been deployed on any of the hardware nodes managed by the performers. For instance, this situation may occur when a hardware node first comes into existence and thus has not been allocated any cloud resources. Stage 1105 also illustrates each performer 1130-1140 sending an "ad-state" query 1165 to the director 1125. Each query 1165 request to the director asks the director to provide information regarding the particular performer's 1130-1140 administrative state.

Stage 1110 illustrates the director 1125 sending, in response to the query it received at stage 1105, configuration data 1170-1180 to each performer 1130-1140. In particular, the director sends to each particular performer, the set of administrative state information (e.g., configuration data) applicable to the performer. As illustrated, director 1125 is sending "P1" configuration data 1170 to performer 1 1130, "P2" configuration data 1175 to performer 2 1135 and "P3" configuration data to performer 3 1140. Each of the different configuration data 1170-1180 sets forth the cloud resources that have been allocated for hosting on the particular node. Thus, P1 configuration data 1170 would list (not illustrated) resources R1, R4, and R6, P2 configuration data 1175 would list resource R3 and P3 configuration data 1180 would list resources R2 and R5. In some embodiments, the configuration data 1170-1180 includes the entire administrative state of the hosting, including a list of all of the cloud resources, and each particular performer would then analyze the data for those cloud resources related to the particular performer.

After each performer 1130-1140 receives its administrative state information, as included in the configuration data 1170-1180, each performer then examines the operational state of its hardware node to verify that it matches the administrative state of the node. Stage 1115 of FIG. 11*b* illustrates each performer 1130-1140 has now updated its operational state 1150-1160 to reflect the information it received regarding its administrative state. As such, operational state table 1150 now indicates that resources R1, R4, and R6 are on performer 1 1130 and have a status of "building." Likewise, operational state table 1155 now indicates that resource R3 is on performer 2 1135 and has a status of "building" and operational state table 1160 indicates that resources R2 and R5 are on performer 3 1140 and have a status of "building". Each of these cloud resources has now been allocated to the hardware node managed by the particular performer of that node and is in the process of being built on the hardware resources of the node.

Figure 12A:
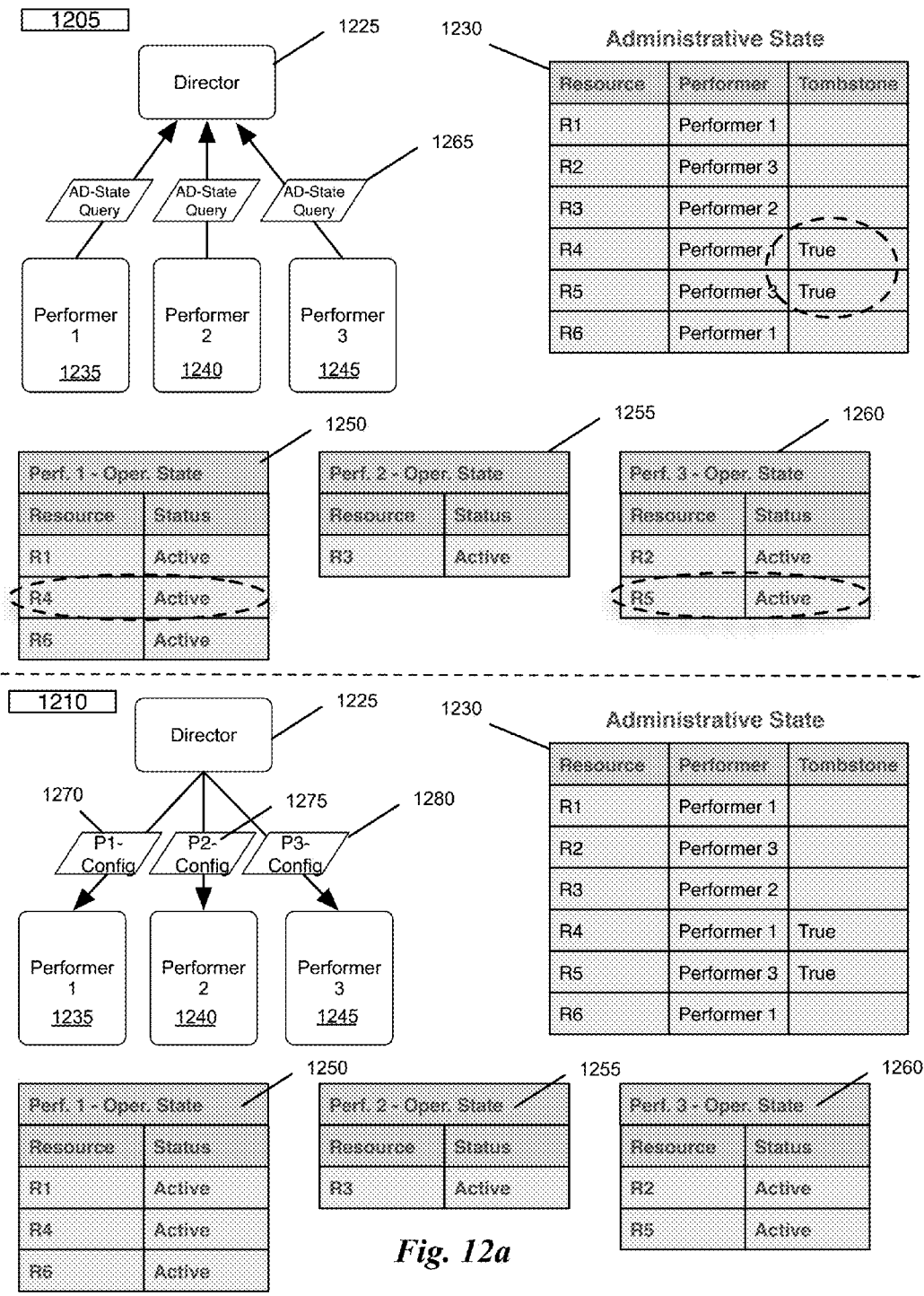
FIG. 12a conceptually illustrates the hosting system updating the operational state of the hardware nodes to reflect an updated administrative state.
Figure 12B:
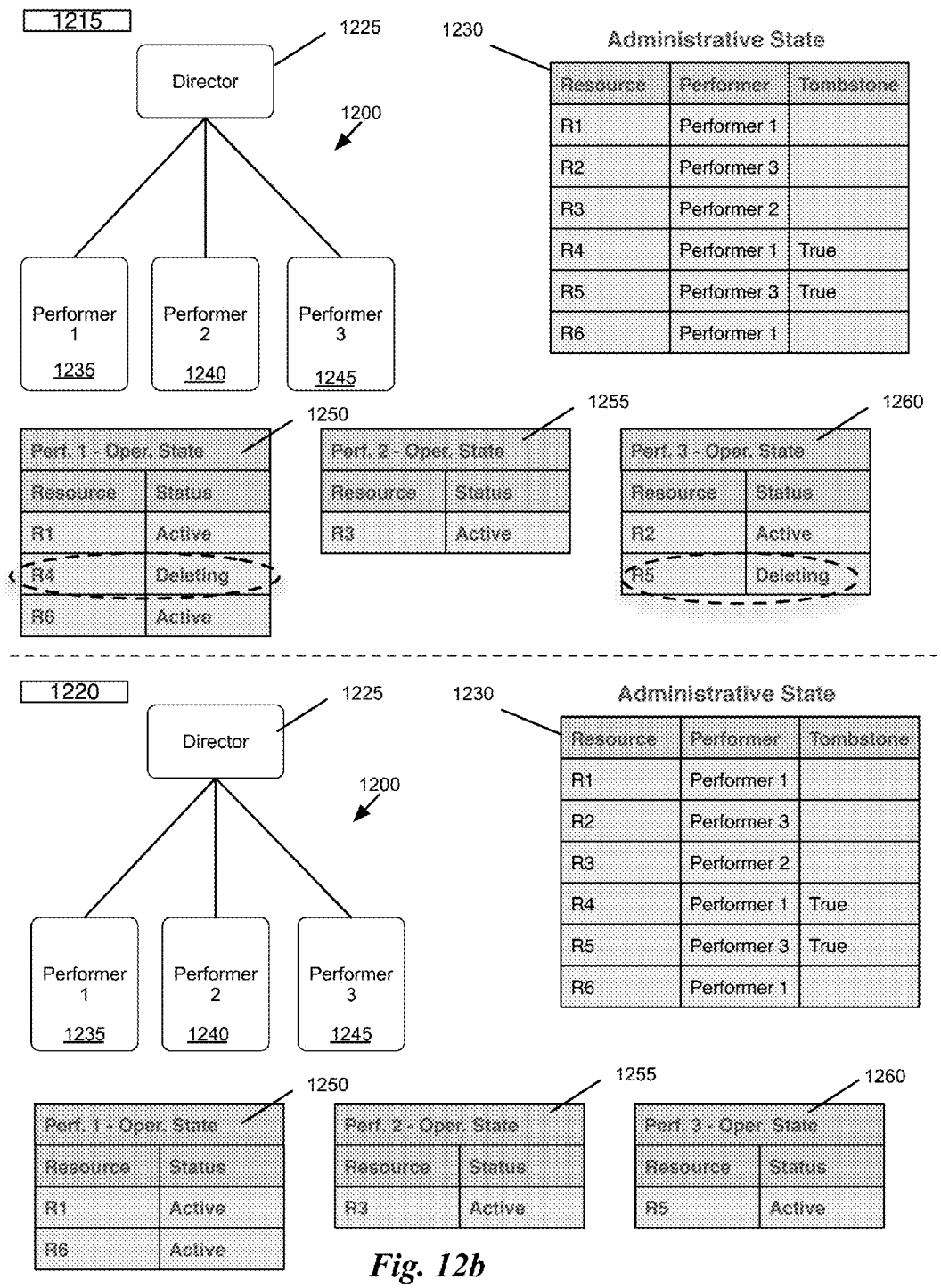
FIG. 12b conceptually illustrates the hosting system updating the operational state of the hardware nodes to reflect an updated administrative state.

Stage 1120 of FIG. 11*b* illustrates that each of the different cloud resources R1-R6 is now active, as indicated by the "status" column of each of the operational state tables 1150-1160. At this stage, the individual operational states of the hardware resources managed by each performer 1130-1140 matches the administrative state information for the hosting system. In particular, the user's intent is now actuated by the hosting system. Furthermore, the actual operational state of each hardware node has been configured to exactly match the user's intent for their various cloud resource configurations. In order to ensure that the operational state of the hosting system continues to remain consistent with the user's intent as captured by administrative sate of the hosting system set by the director, each performer of the hosting system continuously checks, by sending queries to the director, with the director to retrieve its administrative state information for its hardware node. Thus, each performer can manage the operational state of its node to capture any updates that may have to the administrative state of the node. FIGS. 12*a-b* illustrate in four stages 1205-1220 the hosting system updating the operational state of the hardware nodes to reflect an updated administrative state. FIGS. 12*a-b* is setup similar to FIGS. 11*a-b*, but with the particular information included within the state tables being changed to illustrate different scenarios that may occur during the operations of the hosting system.

Each stage 1205-1220 of FIGS. 12*a-b* illustrate the director 1225, several performers 1235-1245, the administrative state 1230 of the hosting system, and the operational state tables 1250-1260 for each operational state of each performer 1235-1245. In this particular example, the administrative state table 1230 also includes a "tombstone" column. This column exists to indicate whether a particular cloud resource has been "deleted" by the user or some other actor. In some embodiments, the hosting system does not physically remove or delete a cloud resource from the hardware node when a user "deletes" the cloud resource from their configurations, but only designates that the cloud resource as being "deleted" for the user. For example, if a user "deletes" a cloud storage share resource from the resource configurations, the hosting system does not actually delete the file system from the hardware resources of the node, but rather sets an indicator within the administrative state to note that the cloud storage share has been deleted for the particular user. As such, the tombstone column of administrative table 1230 indicates that resources R4 and R5 have a true value to indicate that these cloud resources have been "deleted" by the user. Furthermore, the operational state table 1250 of performer 1 1235 indicates that resource R4 is currently "active" on the node. Operational state table 1260 of performer 3 1245 also indicates that resource R5 is also "active" on the node. As such, the operational states of these nodes do not match the administrative state of the nodes.

Stage 1205 also illustrates each performer 1235-1245 sending an ad-state query 1265 to the director 1225 asking for the administrative state information for its particular hardware node. As described above, each performer continuously or periodically queries the director asking for its administrative state in order to insure that the user's intent is activated on the actual hardware nodes of the hosting system.

Stage 1210 illustrates each performer 1235-1245 receiving configuration data 1270-1280 from the director 1225. The configuration data 1270-1280 provides the administrative state information for each performer 1235-1245. Although not illustrated in the figure, the P1 configuration data 1270 would include cloud resources R1 and R6. Note that P1 configuration data 1270 would not include cloud resource R4 since cloud resource R4 has a tombstone value of "true" (e.g., has been deleted by the user). P2 configuration data 1275 would include resource R3 and P3 configuration data 1280 would now only include resource R2 and not resource R5 since this cloud resource has also been deleted by the user. After receiving this configuration data 1270-1280 (e.g., the administrative state information for each particular node), each performer 1235-1245 compares the information in the configuration data with the actual operational state of its hardware node. In particular, performer 1 1235 would detect that its operational state does not match its administrative state, since resource R4 is currently active on its hardware node, as indicated by operational state table 1250. Performer 2 1240 would detect that its operational state does match its administrative state, as indicated by operational state table 1255. Thus, Performer 2 would not need to reconfigure or update any of its hardware resources at this point in time. Lastly, performer 3 1245 would also detect that its operational state does not match its administrative state, since resource R5 is currently active on its hardware node, as indicated by operational state table 1260. Thus performer 1 1235 and performer 3 1245 would need to make the necessary modifications to the hardware resources on their respective nodes such their operational states are aligned with the administrative state for the nodes.

Stage 1215 of FIG. 12b illustrates the third stage in which the performers are modifying the hardware resources on their nodes to match the administrative state of the nodes. In particular, operational state table 1250 now indicates that resource R4 is being "deleted" from the hardware node managed by performer 1 1235. Likewise, operational state table 1260 also indicates that resource R5 is being "deleted" from the hardware node managed by performer 3 1245.

Stage 1220 illustrates that each of the operational state tables 1250-1260 now matches the administrative state table 1230. In particular, resource R4 is no longer listed in operational table 1250 and resource R5 is no longer listed in operational table 1260. In order to match the operational state with the administrative state, performer 1 1235 has de-allocated cloud resource R4 from the hardware resources on its node. Likewise, performer 3 1245 has de-allocated cloud resource R5 from the hardware resources on its node. Thus, each performer is responsible for managing the hardware resource allocations for its particular hardware node based on the administrative state set for the node.

B. Hosting System Failure Scenarios

Figure 13A:
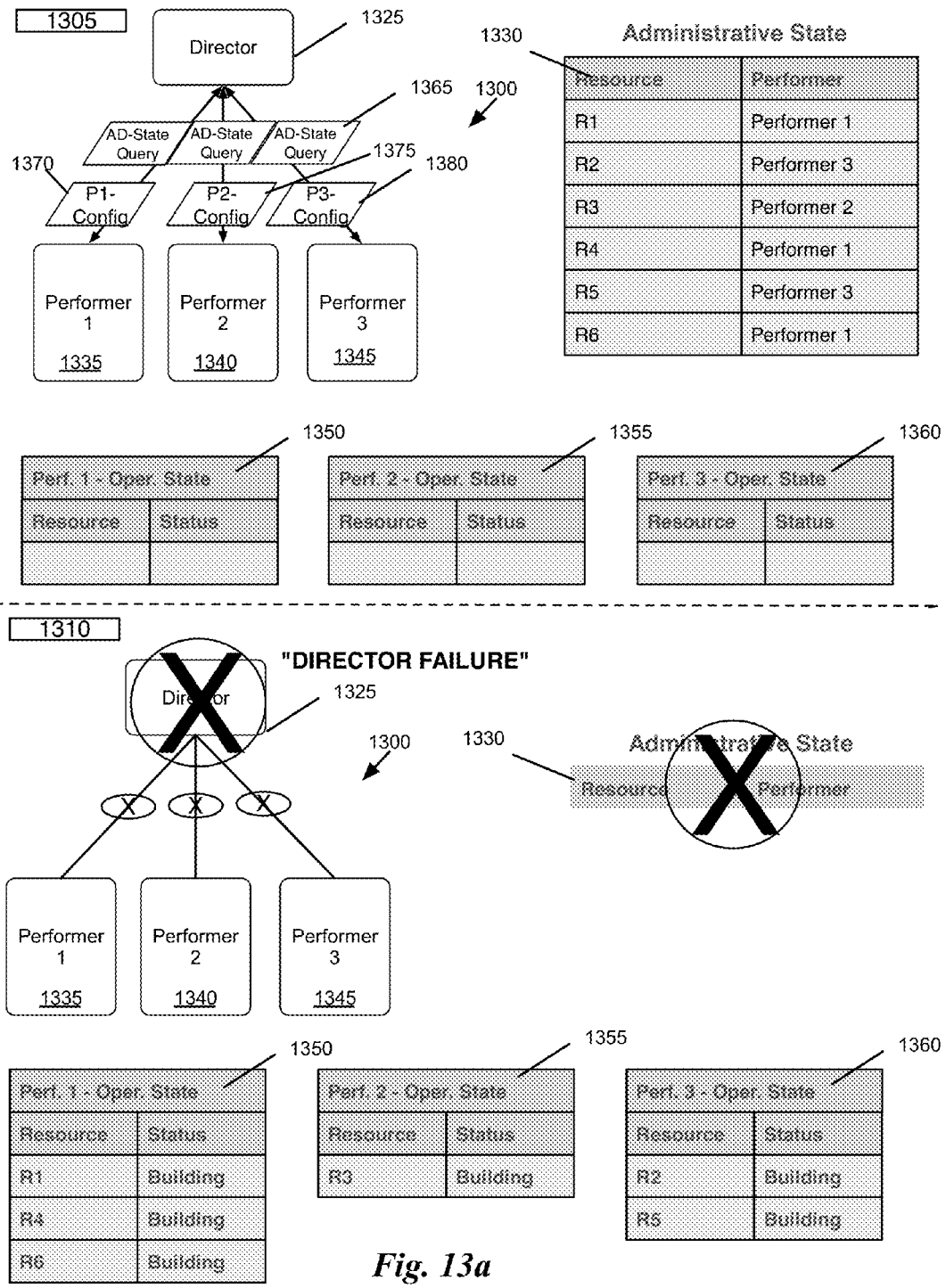
FIG. 13a conceptually illustrates the continued operation of the hosting system in the event of a director failure of some embodiments.
Figure 13B:
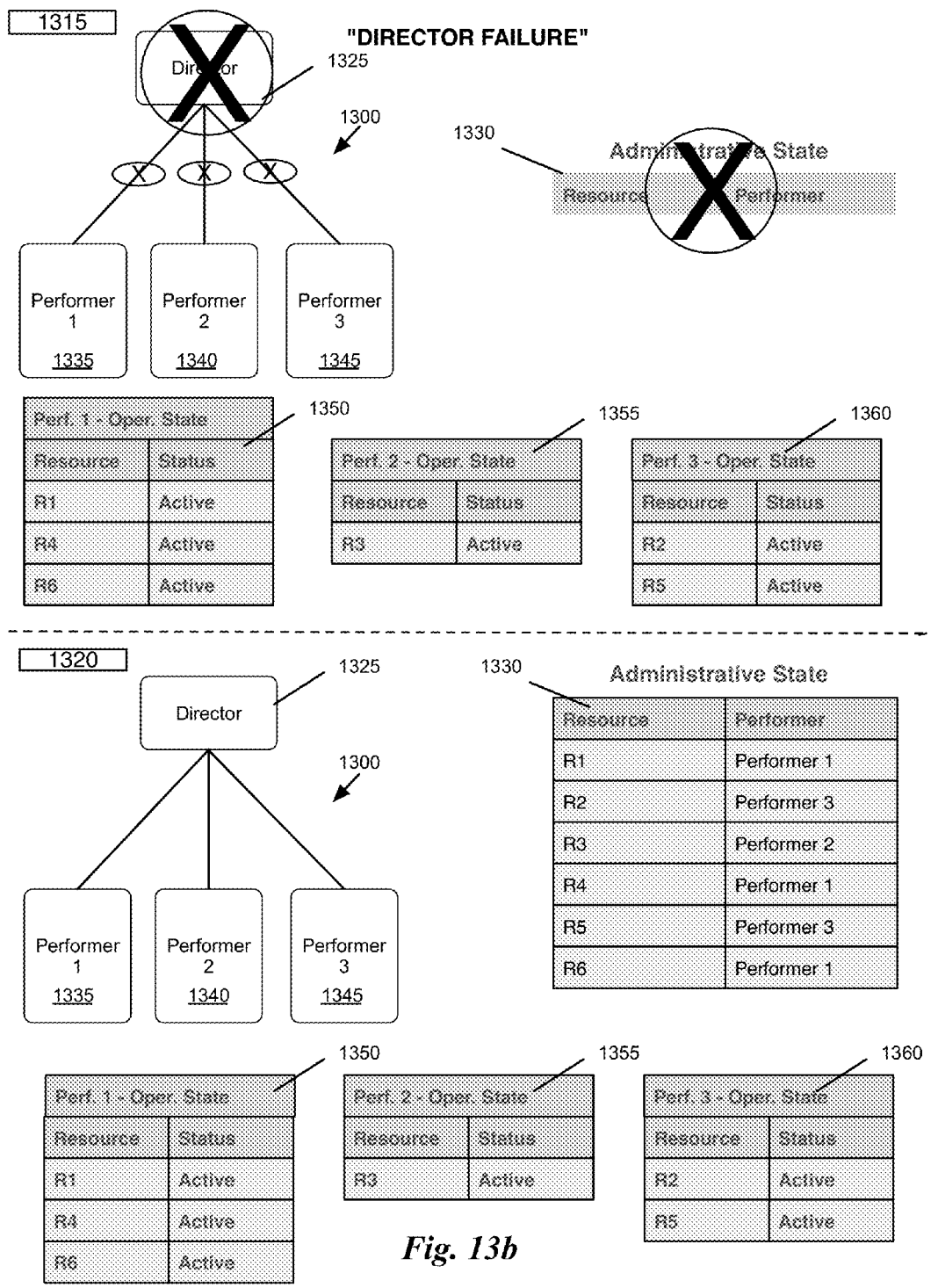
FIG. 13b conceptually illustrates the continued operation of the hosting system in the event of a director failure of some embodiments.

By distributing the management responsibility to the individual performers operating on each hardware node, the hosting system is able to successfully continue operating, even when certain "failures" occur within the system. These failures may include a network failure, a director failure, a node failure, a system outage, a hardware failure, and various other events that alter the normal operations of the hosting system. FIGS. 13a-b illustrate in four stages 1305-1320 the continued operation of the hosting system in the event of a director failure.

As described above, each stage 1305-1320 of FIGS. 13a-b illustrate the hosting system 1300, including director 1325 and performers 1335-1345, the administrative state table 1330, and operational state tables 1350-1360. State 1305 of FIG. 13a illustrates the administrative state table 1330 includes six resources, R1-R6, each allocated to a particular performer. In particular, resources R1, R4 and R6 have been allocated to performer 1 1335, resource R3 to performer 2 1340, and resources R2 and R5 to performer 3 1345. However, the operational state tables 1350-1360 for performers P1-P3 1335-1345 do not currently list any resources as operating on the hardware resources of the nodes managed by these performers. Furthermore, each performer 1335-1345 has sent an ad-state query 1365 and is receiving its administrative state information (e.g., P1-P3 configuration data 1370-1380). In order to reduce the number of stages illustrated in this figure, stage 1305 simultaneously illustrates the data being sent and received between the director and performers in one stage. However, these steps are not performed simultaneously, but rather are performed sequentially at different times in that the director first must receive a query from the performer asking for its administrative state. The director then sends the administrative state information to the particular performer that has requested the information.

After receiving the administrative state configuration data 1370-1380, each performer can then determine whether the actual operational state of its hardware resources matches its administrative state. Stage 1310 illustrates the operational state tables 1350-1360 now reflect that the cloud resources R1-R6 are being built (e.g., "building") on the particular hardware nodes managed by performers P1-P3 1335-1345. Furthermore, the director 1325 of the hosting system 1300 is now in a failed operational state and thus can no longer communicate with any of the hardware nodes. However, each performer P1-P3 1335-1345 continues to operate and has not been affected by the failure of the director 1325. Each performer P1-P3 1335-1345 operates on an individual hardware node and manages the hardware resources of that particular node. Thus, each performer 1335-1345 can continue to update and/or modify its resource allocations, even with the director 1325 being in a failed state. In previous centralized resource management schemes where a centralized module is responsible for managing and configuring the resources of the hardware nodes, a system failure at the centralized module would cause a total failure across all of the nodes of the hosting system. However, by distributing the resource management responsibilities to the individual nodes, a failure at the centralized director of the hosting system does not completely crash the entire system.

Although each performer is able to continue managing the cloud resources on its node, the performers will not be able to receive any updates that a user has made to their cloud resource configurations until the director 1325 is again in an operational state. Stage 1315 of FIG. 13*b* illustrates that resources R1-R6 now have an "active" status in operational state tables 1350-1360. However, the director 1325 is still in a failed operational state. Thus, the performers 1335-1345 are unable to send queries to the director 1315 and thus are not going to detect possible updates that may have been made pertaining to their administrative state.

Stage 1320 of FIG. 13*b* illustrates that the director 1325 is now back into an operational state and able to communicate with performers P1-P3 1335-1345. At this point, each performer 1335-1345 can once again send queries to the director 1325 asking for its administrative state. As illustrated, each of the operational state tables 1350-1360 list the cloud resources as allocated within the administrative state table 1330. Thus the actual operational state of the hardware nodes matches the intended administrative state of the hosting system.

Figure 14A:
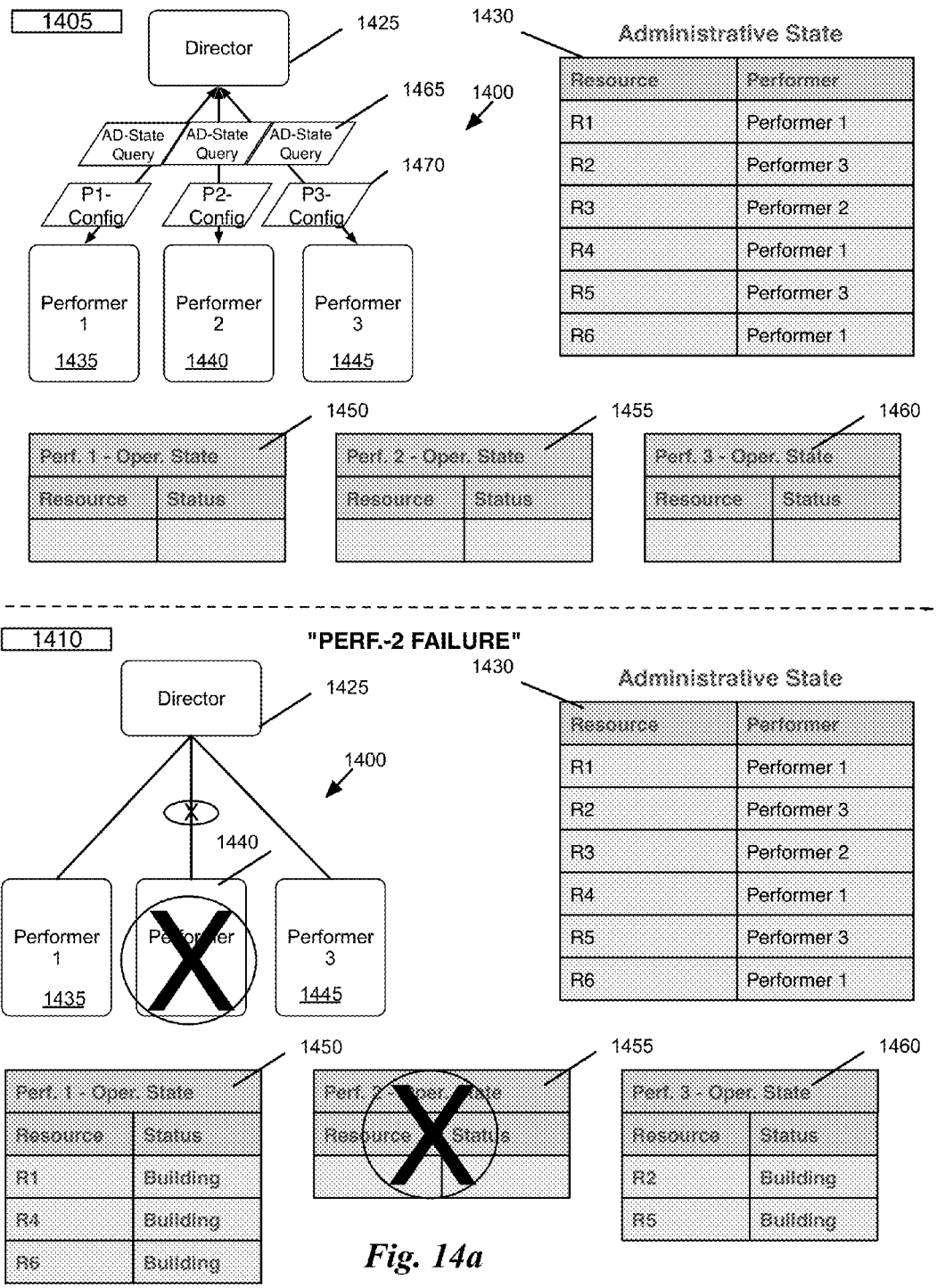
FIG. 14a conceptually illustrates the continued operation of the hosting system in the event of a node failure of some embodiments.
Figure 14B:
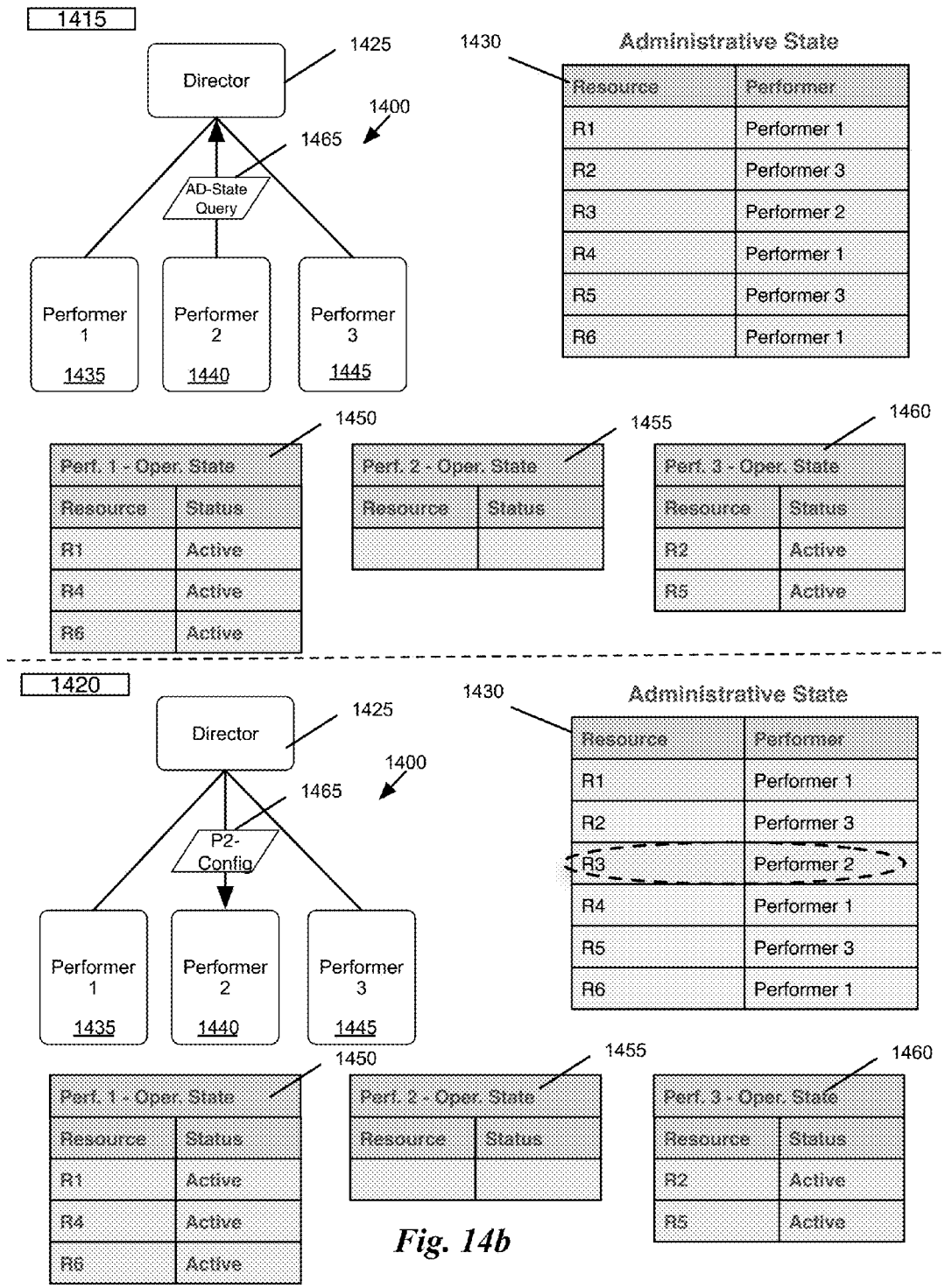
FIG. 14b conceptually illustrates the continued operation of the hosting system in the event of a node failure of some embodiments.
Figure 14C:
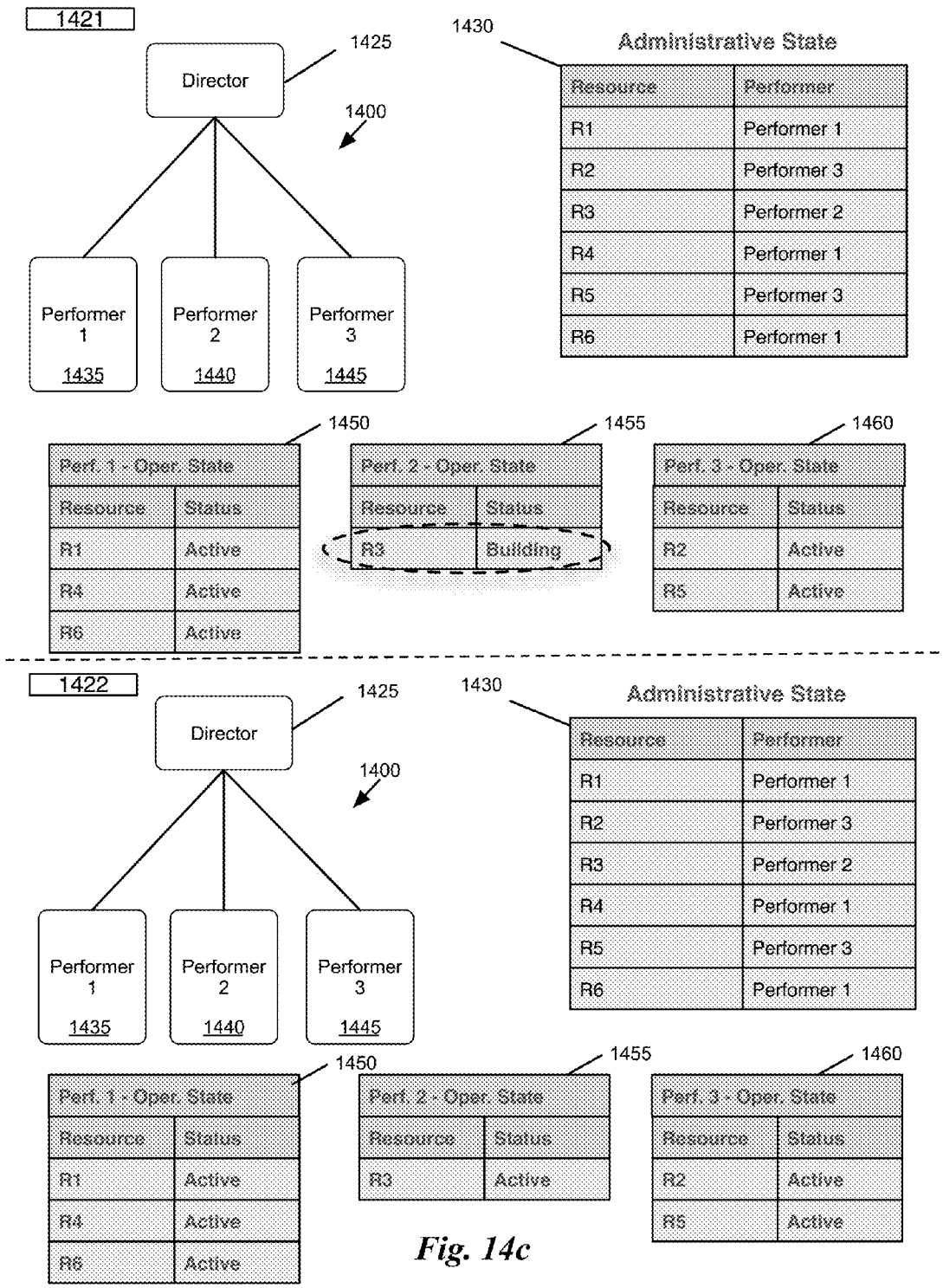
FIG. 14c conceptually illustrates the continued operation of the hosting system in the event of a node failure of some embodiments.

Using a performer on each hardware node is also beneficial during a node failure on the hosting system. For example, when a single hardware node fails in the hosting system, the other hardware nodes are still able to continue to operate without having the single failed node halt the entire operation of the hosting system. FIGS. 14*a-c* illustrate in six stages 1405-1422 the continued operation of the hosting system in the event of a node failure.

As before, each stage 1405-1422 of FIGS. 14*a-c* illustrate the hosting system 1400, including director 1425 and performers 1435-1445, the administrative state table 1430, and operational state tables 1450-1460. Stage 1405 of FIG. 14*a* is similar to stage 1305 of FIG. 13*a*. As described before, the administrative state table 1430 includes six resources, R1-R6, each allocated to a particular performer. In particular, resources R1, R4 and R6 have been allocated to performer 1 1435, resource R3 to performer 2 1440, and resources R2 and R5 to performer 3 1445. However, the operational state tables 1450-1460 for performers P1-P3 1435-1445 do not currently list any resources as operating on the hardware resources of the nodes managed by these performers. Furthermore, each performer 1435-1445 has sent an ad-state query 1465 and is receiving its administrative state information (e.g., P1-P3 configuration data 1470-1480). After receiving the administrative state configuration data 1470-1480, each performer can then determine whether the actual operational state of its hardware resources match the administrative state set for the node.

Stage 1410 illustrates that performer 2 1440 is now in a failed operational state. As such, the cloud resource R3, which has been allocated to performer 2 1440 based on the administrative state table 1430, is also not operative as it does not appear within any of the operational state tables 1450-1460. However, operational state table 1450 indicates that resources R1, R4 and R6 are currently being built on the hardware node managed by performer 1 1435. Likewise, operational state table 1460 indicates that resources R2 and R5 are also being built on the hardware node managed by performer 3 1445. Thus, even though the performer 2 1440 of the hosting system 1400 is not currently operational, performers P1 1435 and P3 1445 each continue to build the resources for their node and have not been effected by the failure of performer 2 1440.

Stage 1415 of FIG. 14*b* illustrates that performer 2 1440 is again back to an operational state. This may happen after the hosting system 1400 is able to correct the particular issue causing the failure of the hardware node. Performer 2 1440 is also sending an ad-state query 1465 to the director 1425 asking the director for information regarding the administrative state of its hardware node. In some embodiments, after a performer become operational, it immediately sends a query to the director 1425 asking for its administrative state.

Stage 1420 of FIG. 14*b* illustrates the director 1425 sending performer 2 1440 its P2-configuration data 1465 containing information regarding its administrative state. The P2-configuration data 1465 includes a list (not illustrated) with cloud resource R3, as had been designated by the administrative state table 1430. As such, performer P2 1440 now knows how the operational state of the resources on its hardware node should be configured based on the administrative state information provide in the P2-configuration data 1465.

Stage 1421 of FIG. 14*c* illustrates that the operational state table 1455 for performer 2 1440 now indicates that resource R3 is being built on the hardware resources managed by performer 2. Stage 1422 of FIG. 14*c* illustrates that the operational state of each of the hardware nodes managed by performers P1-P3 1435-1445 now matches the intended administrative state of the hosting system 1400. In particular, each operational state table 1450-1460 lists the corresponding resources that have been designated by the administrative state table 1430. In particular, operational state table 1450 indicates that resources R1, R4, and R6 are currently "active" on the hardware node managed by performer 1 1435. Operational state table 1455 indicates that resource R3 is currently "active" on the hardware node managed by performer 2 1440. Lastly, operational state table 1460 indicates that resources R2 and R5 are currently "active" on the hardware node managed by performer 3 1445. Each of these operational tables match the information contained within the administrative state table 1430, which indicates that resources R1, R4 and R6 should be deployed on performer 1, resource R3 should be deployed on performer 2, and resources R4 and R6 should be deployed on performer 3.

Figure 15:
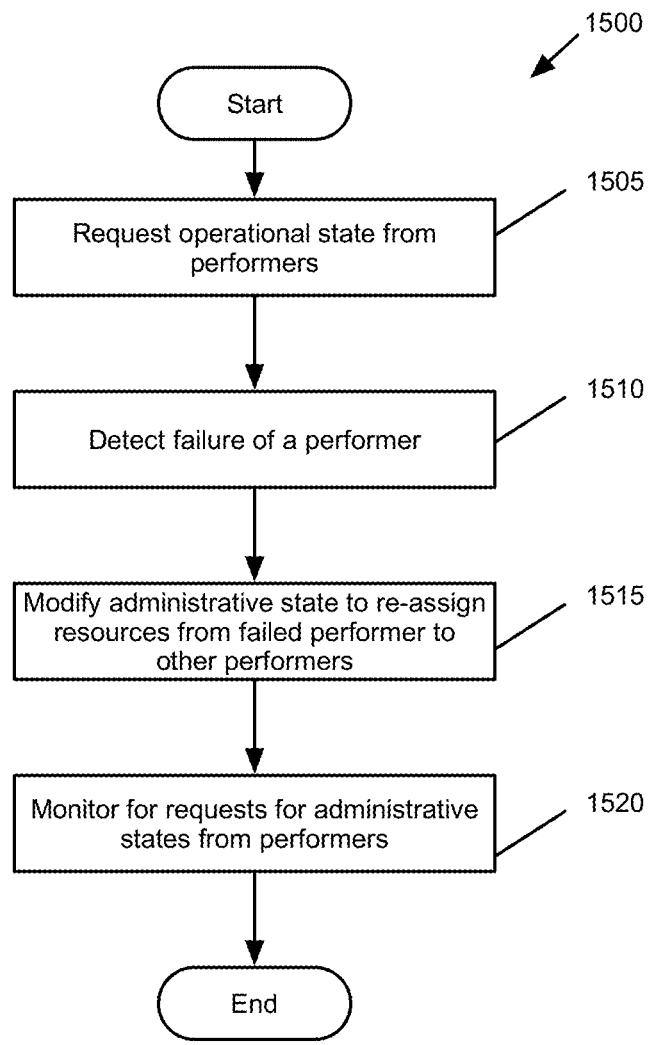
FIG. 15 conceptually illustrates a process for migrating resources from a failed node of some embodiments.

FIGS. 14*a-c* illustrates hosting system waiting for a failed node to once again become operational in order to deploy the cloud resources allocated to the failed node. In some embodiments, when the hosting system detects the failure of a particular hardware node, the hosting system may migrate the cloud resources that have been allocated to that node to other hardware nodes that are operational. In some embodiments, the hosting system waits for a certain amount of time to see if a failed node can again become operational before deciding to migrate the cloud resources on the failed node to a different operational node. FIG. 15 illustrates a process 1500 for migrating resources from a failed node. The process 1500 is used by a director for detecting a failed node (or failed performer on a node) and for migrating resources to a different node. Initially, the process (at 1505) requests the operational state information from each performer of the hosting system. In some embodiments, the director may send requests to the performers on the hardware nodes for certain information regarding their operational state. For example, the director may send a periodic query to each performer to determine whether the performer is active and operating. Each performer may send a response to the director to signal that it is currently operative.

Figure 16A:
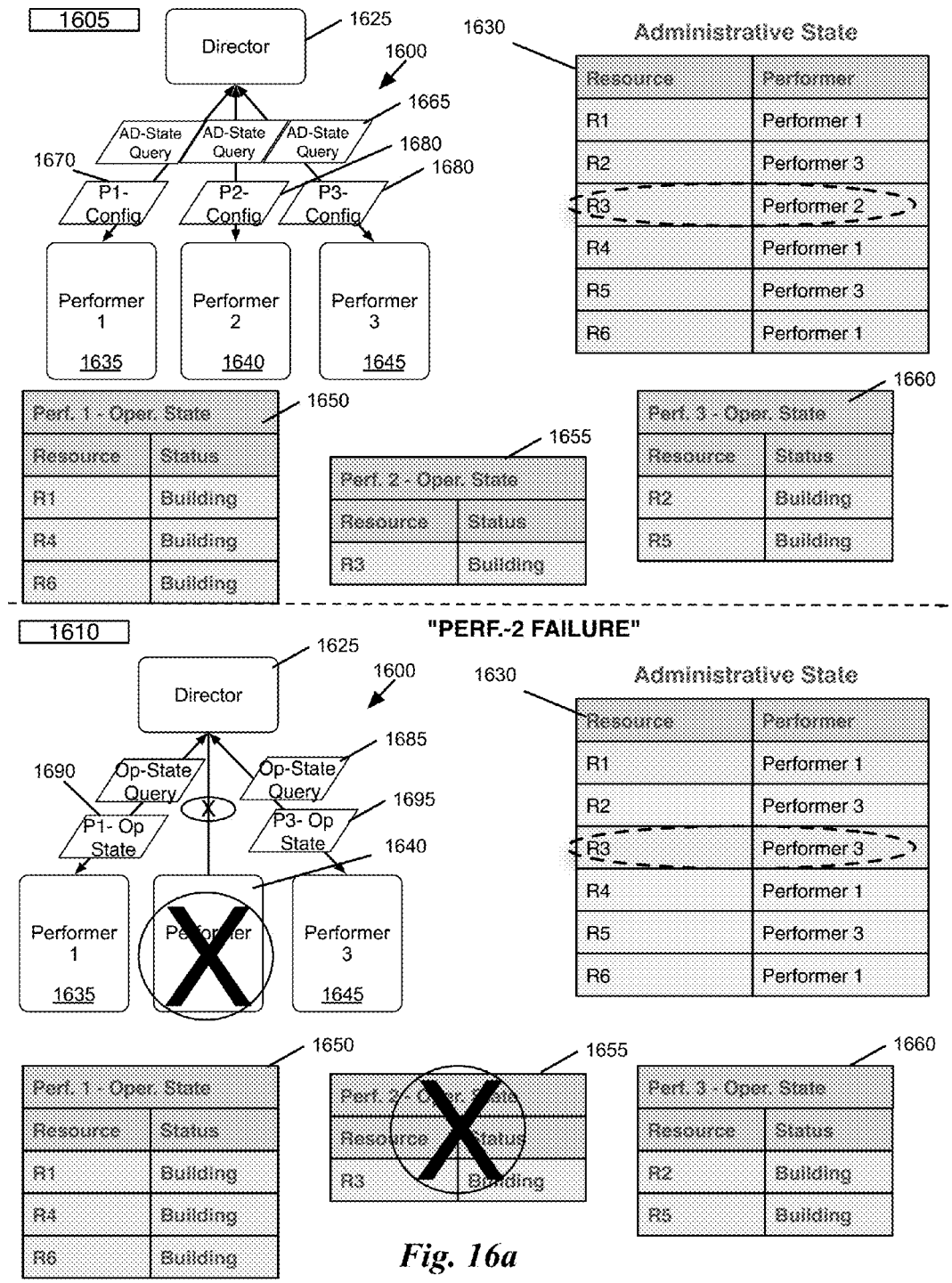
FIG. 16a conceptually illustrates the failure of a hardware node and the migration of the cloud resources from a node to a different node of some embodiments.
Figure 16B:
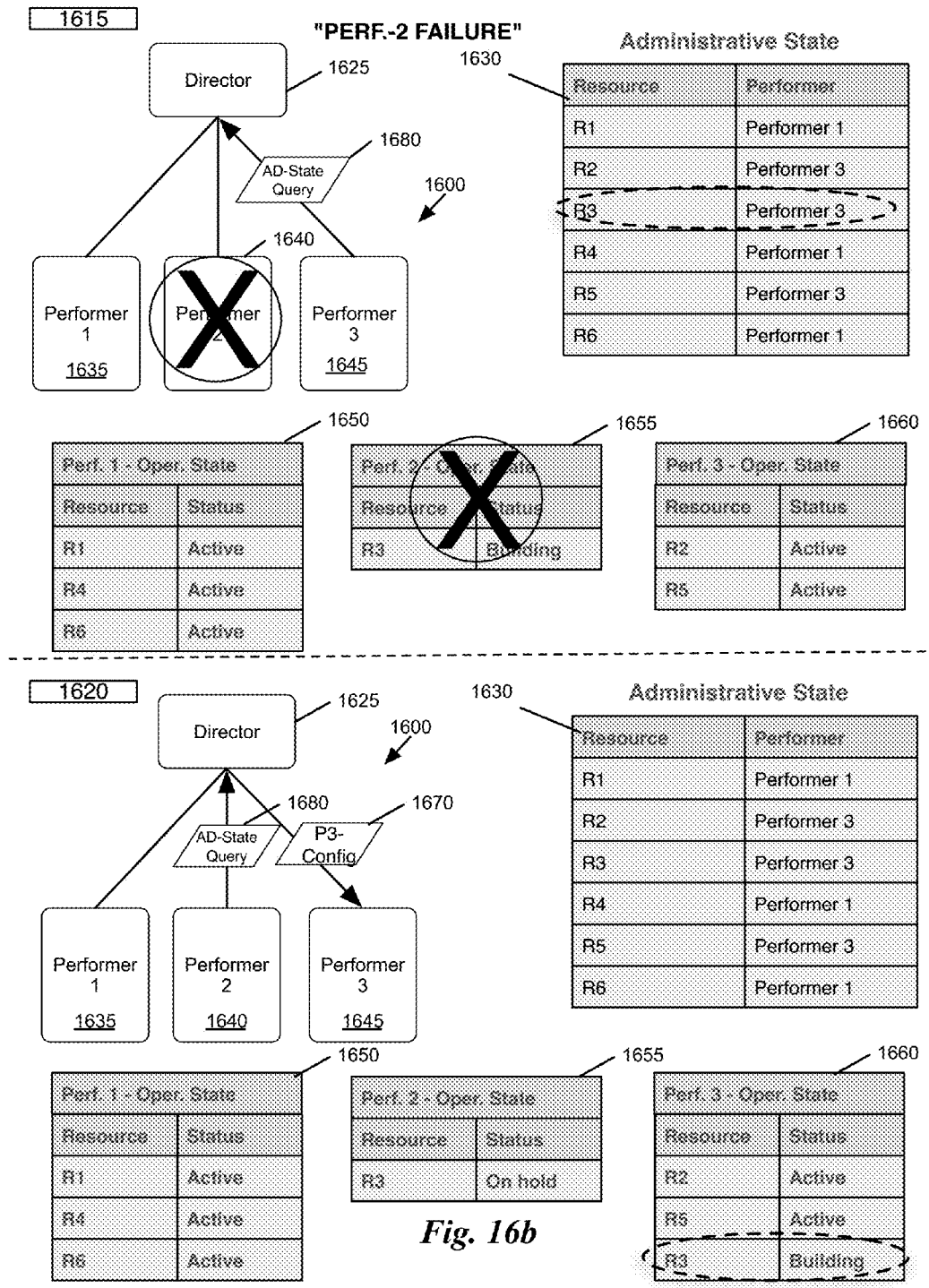
FIG. 16b conceptually illustrates the failure of a hardware node and the migration of the cloud resources from the node to a different node of some embodiments.
Figure 16C:
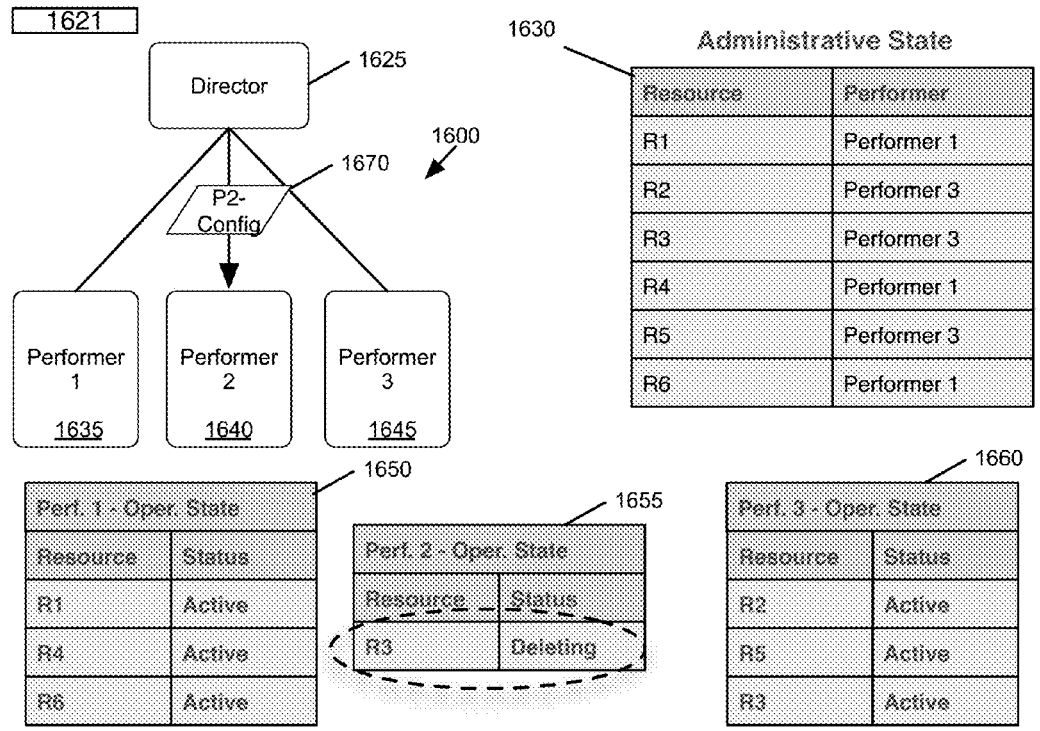
FIG. 16c conceptually illustrates the failure of a hardware node and the migration of the cloud resources from the node to a different node of some embodiments.

The process may then detect (at 1510) a failure of a particular performer. For example, the process may not receive a response from a particular performer, which would indicate that the performer is not currently operative or may be in a failed operational state. When the process detects a failed performer (or hardware node), the process modifies (at 1515) the administrative state of the hosting system in order to re-allocate the cloud resources on the failed node to other nodes/performers within the hosting system that are operative. In some embodiments, the process applies similar mechanisms as described above in FIGS. 7-8 for reallocating the cloud resources to other nodes. Once the process determines which of the other hardware nodes are to host the cloud resources on the failed hardware node, the process updates the administrative state of the hosting system to reflect the new allocation of the cloud resources to the different hardware nodes. The process then waits (at 1520) for requests from the various performers of the system asking for their respective administrative states. When the particular performer or performers that have been designated for hosting the cloud resources from the failed node receive their administrative state information, they will then be able to identify the new cloud resource configurations that need to be deployed on their hardware node. FIGS. 16*a-c* illustrate in six stages 1605-1622 the failure of a hardware node and the migration of the cloud resources from this node to a different node. As noted above, certain stages in this figure have combined, for explanation purposes and to reduce the number of stages illustrated in the figure, the steps of sending a query and receiving a response to the query into a single stage, even though these operations would actually be performed sequentially at different times in the actual operations of the hosting system.

Each stage 1605-1622 of FIGS. 16*a-c* illustrate the hosting system 1600, including director 1625 and performers 1635-1645, the administrative state table 1630, and operational state tables 1650-1660. Stage 1605 of FIG. 16*a* is similar to stages 1405 of FIG. 14*a*. The administrative state table 1630 includes six resources, R1-R6, each allocated to a particular performer. In particular, resources R1, R4 and R6 have been allocated to performer 1 1635, resource R3 to performer 2 1640, and resources R2 and R5 to performer 3 1645. Operational state tables 1650-1660 for performers P1-P3 1635-1645 each list the cloud resources currently operating on the hardware nodes managed by these performers. In particular, operational state table 1650 indicates that resources R1, R4, and R6 are currently being built on the hardware node managed by performer P1 1635. Operational state table 1655 indicates that resource R3 is currently being built on the hardware node managed by performer P2 1640. Lastly, operational state table 1660 indicates that resources R2 and R5 are currently being built on the hardware node managed by performer P3 1645.

Furthermore, each performer 1635-1645 has sent an ad-state query 1665 and is receiving its administrative state information (e.g., P1-P3 configuration data 1670-1680). After receiving the administrative state configuration data 1670-1680, each performer can then determine whether the actual operational state of its hardware resources match its administrative state.

Stage 1610 illustrates that performer P2 1640 is now in a failed operational state, as indicated by the large "X" placed over the performer. As such, the cloud resource R3, which was in the process of being built on performer P2 1640 is also not operative as indicated by the large "X" over operational state table 1655. However, operational state table 1650 indicates that resources R1, R4 and R6 are currently being built on the hardware node managed by performer 1 1635. Likewise, operational state table 1660 indicates that resources R2 and R5 are also being built on the hardware node managed by performer 3 1645. As described in FIG. 14 before, even though performer 2 1640 of the hosting system 1600 is not currently operational, performers P1 1635 and P3 1645 each continue to build the resources for their node and have not been effected by the failure of performer 2 1640.

Stage 1610 also illustrates the director 1625 sending an operational state "op-state" query 1685 to each performer P1-P3 1635-1645. The director 1625 in some embodiments, periodically queries the performers 1635-1645 of the hosting system 1600 to retrieve the operational state of each hardware node for various different functions of the hosting system, including detecting any failures of hardware nodes in the hosting system. Stage 1610 illustrates performer P1 1635 sending to the director 1625 a "P1-Op State" data 1690 that contains various information regarding the current operational state of the hardware node managed by this performer. Performer P3 1645 is also sending to the director 1625 a "P3-Op State" data 1695 that contains information regarding the current operational state of the hardware node managed by this performer. As described above, this stage illustrates both the sending and receiving as occurring in the same stage, however, this is only for explanation purposes and to reduce the number of stages that need to be illustrated. In actuality, the director would first send out the "op-state" query to each performer, and then receive, at different times, responses from the performers of the particular performer's "Op-State" data.

Stage 1610 illustrates that performer P2 1640 is not able to respond to the operational state request sent by the director 1625. Thus the director 1625 detects the failure of the hardware node managed by performer P2 1640. Given this failure, the hosting system has re-allocated cloud resource R3, as indicated in administrative state table 1630, to performer P3. In some embodiments, the director notifies the hosting system of a hardware node failure in order for the system to re-allocate the cloud resources on the failed node to a different hardware node. In some embodiments, the director waits for a certain time period in order to give the failed node the opportunity to become operational again before migrating the cloud resources from the failed node to a different operational hardware node.

Stage 1615 of FIG. 16*b* illustrates that performer P2 1640 is still in a failed operational state. Furthermore, performer P3 1645 has sent an "ad-state" query 1680 to the director 1625 asking for its administrative state.

Stage 1620 of FIG. 16*b* illustrates the director has sent to performer P3 1645 a "P3-config" data 1670 that includes the administrative state information for this performer. In particular, the "P3-config" data would include (not illustrated) cloud resources R2, R5, and the recently added R3 cloud resource information which was previously allocated to performer P2 1640. As such, performer P3 1645 would compare its operational state with the administrative state to recognize that it needs to build resource R3 on its hardware node. Operational state table 1660 for performer P3 1645 thus indicates that resource R3 is being built on the hardware node managed by this performer.

Stage 1620 also illustrates that performer P2 1640 is once again back to an operational status. The operational state table 1650 for performer P2 1640 indicates that resource R3 is currently "on hold" on the node. In particular, performer P2 1640 must again ask the director 1625 for its administrative state in order to know how to configure its resources. Thus, since cloud resource R3 was in the process of being built prior to the failure of performer 2 1640, the building process has now been placed on hold until the performer obtains its administrative state.

Stage 1621 of FIG. 16*c* illustrates performer P2 1640 now receiving its administrative state information, within the "P2-Config." data 1670 from the director 1625. The P2-Config. data 1670 would include all of the cloud resources that are to be hosted on the hardware node managed by performer P2 1640. At this particular stage, no cloud resources have been allocated to performer P2 1640, as indicated by the administrative state table 1630 and thus the P2-Config. data 1670 would not include any cloud resource information. Stage 1621 illustrates that the operational state 1655 for performer P2 1640 indicates that it is "deleting" cloud resource R3, (since this resource had been migrated by the hosting system onto performer P3 1645). As described above, in some embodiments, the "deleting" of a cloud resource does not physically remove all of the various configurations from the node, but only designate that the particular user configured cloud resource is no longer being hosted by the particular node.

The final stage 1622 of FIG. 16c illustrates that operational state table 1655 for performer P2 1640 indicates that currently there are no cloud resources hosted on the node managed by this performer. Furthermore, each of the cloud resources listed within operational table 1650 for performer P1 1635 and operational table 1660 for performer P3 1645 correctly correspond to the cloud resources listed within the administrative state table 1630. In particular, operational table 1650 indicates that cloud resources R1, R4, and R6 are currently "active" on the hardware node managed by performer P1 1635 and operational table 1660 indicates that cloud resources R2, R5, and R3 are currently "active" on the hardware node managed by performer P3 1645. This matches the administrative state table 1630, which indicates that resources R1, R4, and R6 have been allocated to performer P1, and resource R2, R3, and R6 have been allocated to performer P3 (and no cloud resource have been allocated to performer P2).

By distributing the management responsibility of each hardware node to a performer operating on the node, the hosting system is able to implement an "idempotent" framework that prevents multiple duplicative cloud resources from being deployed on the hosting system. In particular, in prior centrally managed hosting systems having a centralized module responsible for managing the resources of all hardware nodes, many situations would occur in which the centralized module would deploy the same cloud resource multiple times. For example, the cloud resource would be in the processes of deploying a virtual machine onto a particular hardware node and during the deployment process, encounter a failure (e.g., network failure, hardware failure, etc.) that required the centralized module to re-deploy the virtual machine. In addition to creating partially built cloud resources, this centralized module would be unable to prevent multiple deployments of the same cloud resource. For instance, if a user submitted a request for a application server, but because of a network issue, continuously submitted the same request for the same application server, the centralized module in some embodiments would receive and deploy numerous different application servers. This would quickly deplete the resources available on the hosting system. In particular, the hosting system would have partially built "artifacts" of certain cloud resources, and multiple duplicative instantiations of other cloud resources.

Figure 17A:
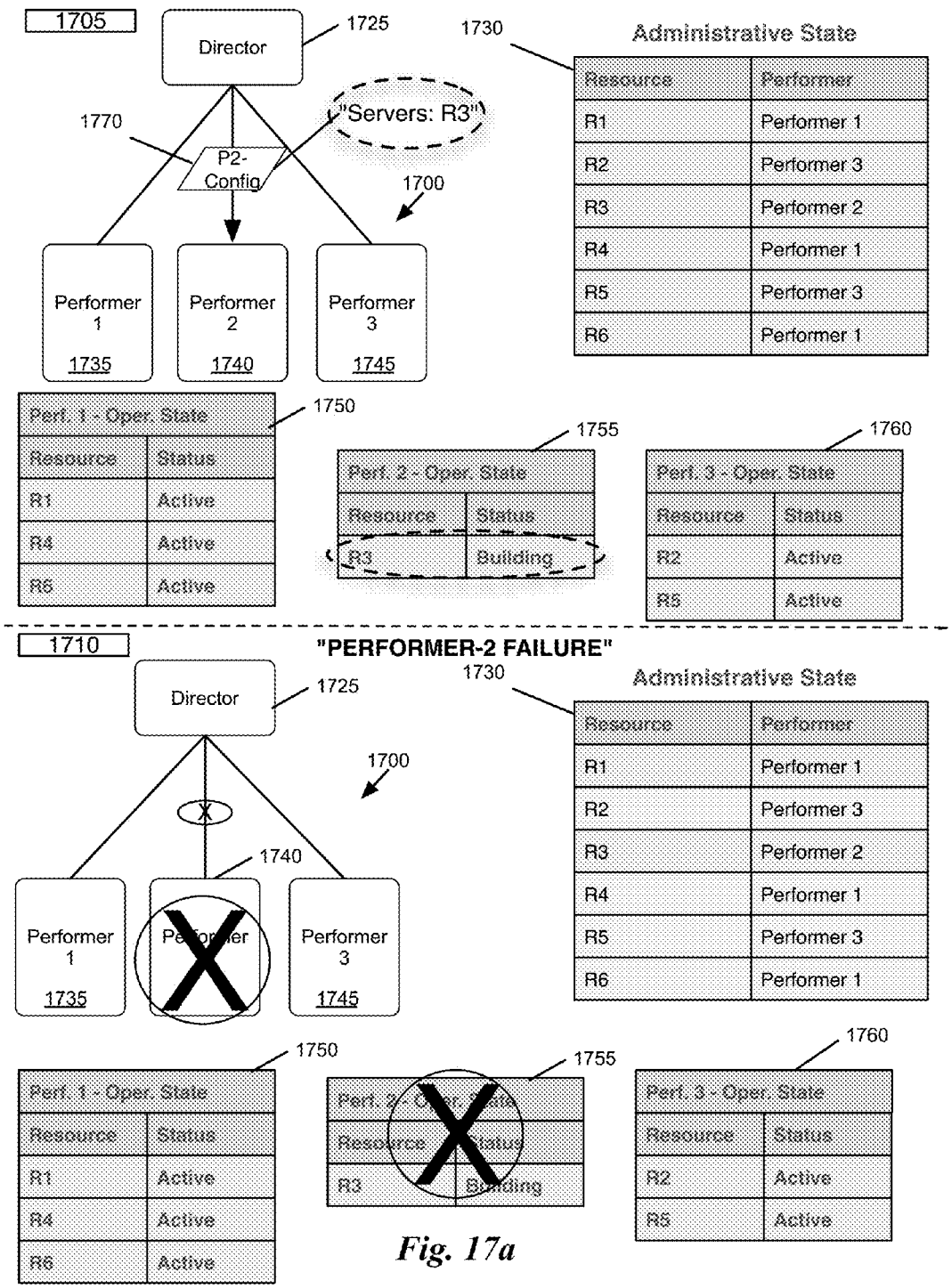
FIG. 17a conceptually illustrates the idempotence of the system during the deployment of a particular cloud resource.
Figure 17B:
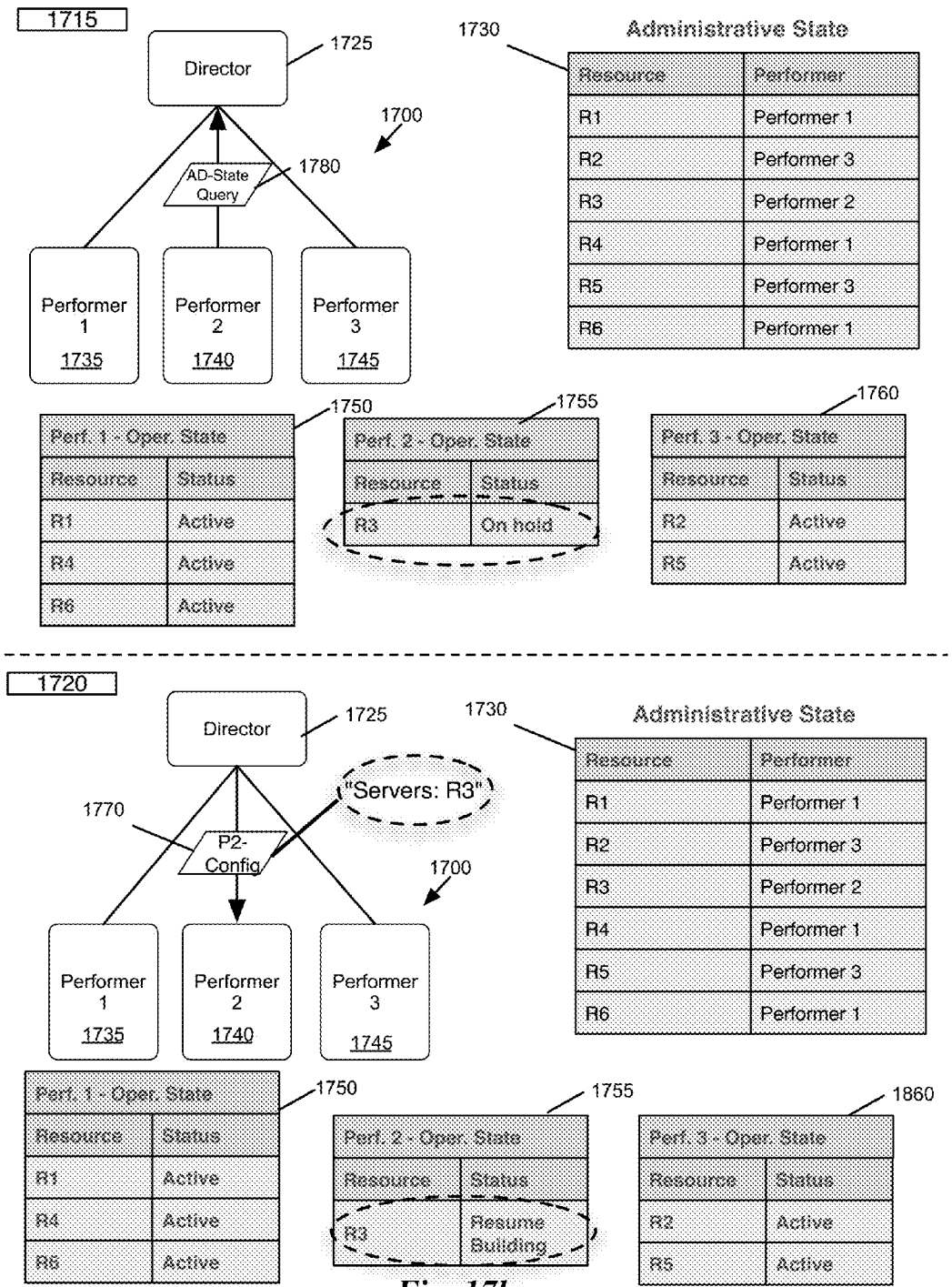
FIG. 17b conceptually illustrates the idempotence of the system during the deployment of a particular cloud resource.

Unlike a centrally managed hosting system, the distributed management framework ensures the idempotence of the cloud resources. In particular, when cloud resource is allocated for deployment on the hosting system, the hosting system is able to deploy a single instance of the cloud resource on the hardware nodes of the system. The hosting system creates this idempotence by using the director-performer paradigm, with the director responsible for tracking the user's intended administrative state and each performer responsible for ensuring that its hardware node is configured according to its administrative state. FIGS. 17a-b illustrate in four stages 1705-1720, this idempotence of the system during the deployment of a particular cloud resource.

C. Hosting System Idempotence

Each stage 1705-1722 of FIGS. 17a-b illustrate the hosting system 1700, including director 1725 and performers 1735-1745, the administrative state table 1730, and operational state tables 1750-1760. As described before, the administrative state table 1730 includes six resources, R1-R6, each allocated to a particular performer. In particular, resources R1, R4 and R6 have been allocated to performer 1 1735, resource R3 to performer 2 1740, and resources R2 and R5 to performer 3 1745. Operational state tables 1750-1760 for performers P1-P3 1735-1745 each list the cloud resources currently operating on the hardware nodes managed by these performers. In particular, operational state table 1750 indicates that resources R1, R4, and R6 are currently active on the hardware node managed by performer P1 1735. Operational state table 1660 indicates that resources R2 and R5 are currently active on the hardware node managed by performer P3 1745.

Performer P2 1740 has also received a P2-Configuration data 1770 containing the administrative state for this node. In some embodiments, this may occur after performer P2 has sent a query (not illustrated) to the director 1725 requesting its administrative state. The P2-configuration data would include the list of cloud resources that have been allocated to performer P2 1740, which includes cloud resource R3. As illustrated in stage 1705, operational state table 1755 indicates that resource R3 is currently being built on the hardware node managed by performer P2 1740.

At stage 1710 of FIG. 17a, performer P2 1740 has now failed, as indicated by the large "X" over the performer and the corresponding operational state table 1755. Thus, the communication link between performer P2 1740 and the director 1725 is no longer operational, and the cloud resource R3 allocated on this node is not being built. In this particular example, the director 1725 does not migrate this cloud resource to a different node. However, as illustrated above in FIGS. 16a-c, in certain situations, the director may decide to migrate the cloud resources on a failed node for hosting on different operational nodes.

Stage 1715 of FIG. 17b now illustrates that performer P2 1740 is back to an operational status. Furthermore, the operational state table 1755 of performer P2 1755 indicates that cloud resource R3 is currently allocated to this hardware node, but has an operational status of "on hold" to indicate that the performer has not yet began configuring the operational state of its hardware node. In particular, performer P2 1740 has sent an ad-state query 1780 to the director 1725 asking for its administrative state. The performer P2 1740 needs to know exactly what the administrative state of the hardware node should be before it begins to continue configuring and modifying the resources on its hardware node.

Stage 1720 illustrates the director 1725 has again sent the P2-configuration data 1770 to performer P2 1740. As before, the P2-configuration data would include the list of cloud resources that have been allocated to performer P2 1740, which includes cloud resource R3. Note that this is the second time this P2-configuration data 1770 is being sent to performer P2 1740, as it had been sent before in stage 1705 of FIG. 17a. After the performer P2 1740 receives the P2-configuration data 1770, it can begin configuring the operational state of its node such that it matches the administrative state as set by the P2-configuration data 1770. In particular, performer P2 1740 would recognize that cloud resource R3 is still allocated to its hardware node, and thus would continue building the cloud resource. Performer P2 1740 would resume building this cloud resource from the particular point prior to its failure. As illustrated, operational state table 1755 now indicates that cloud resource R3 currently has a status of "Resume Building" to indicate that it is back in the process of being built on the node managed by performer P2 1740. Thus the hosting system is able to deploy one instantiation of cloud resource R3, even though it encountered a node failure and had to re-submit the administrative state information to the failed performer on the node. In particular, by having a performer check its operational state against the administrative state, the hosting system can prevent the instantiation of duplicative cloud resources.

Figure 18A:
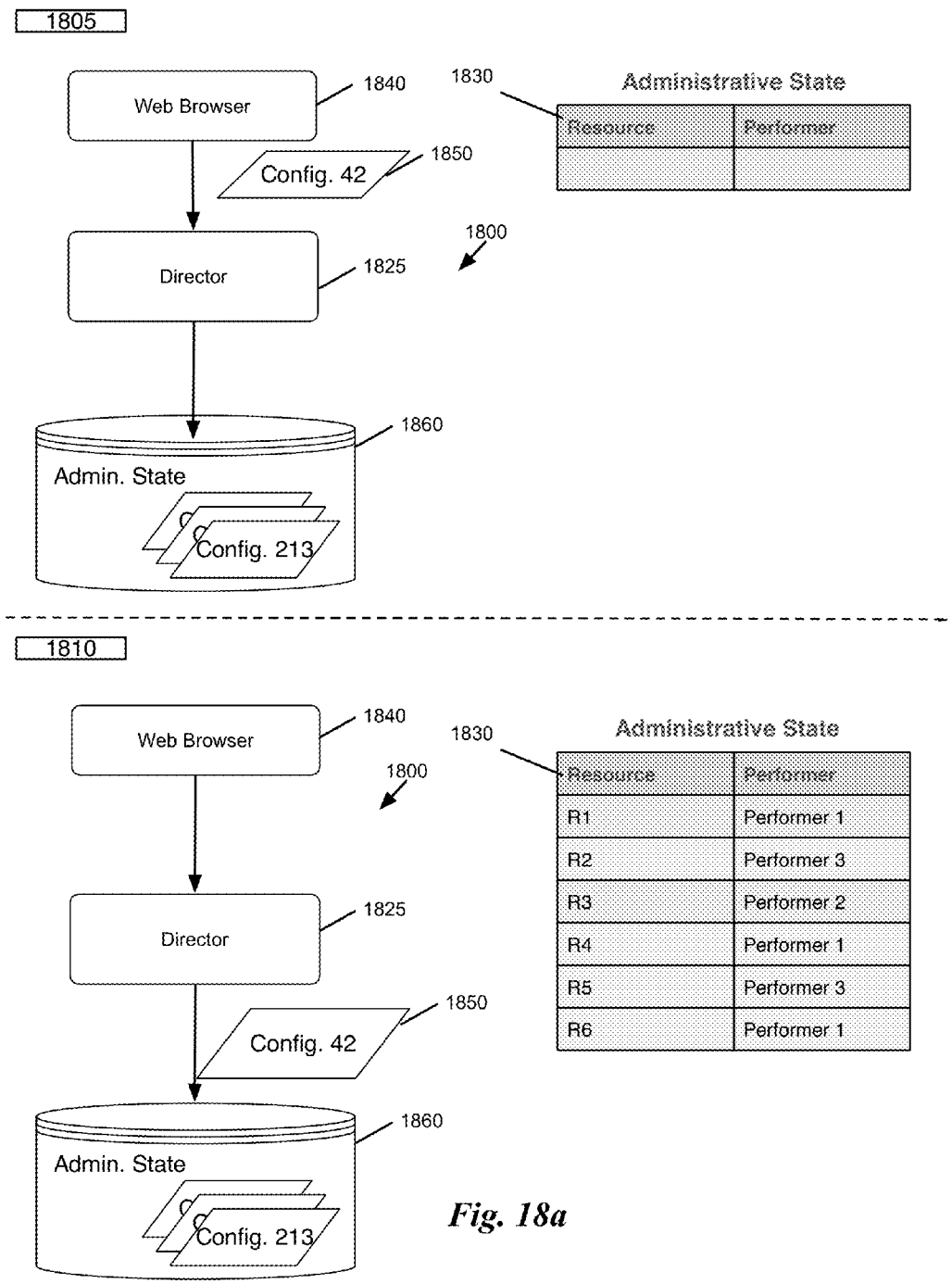
FIG. 18a conceptually illustrates the idempotence of the hosting system with respect to the user interaction with the hosting system.
Figure 18B:
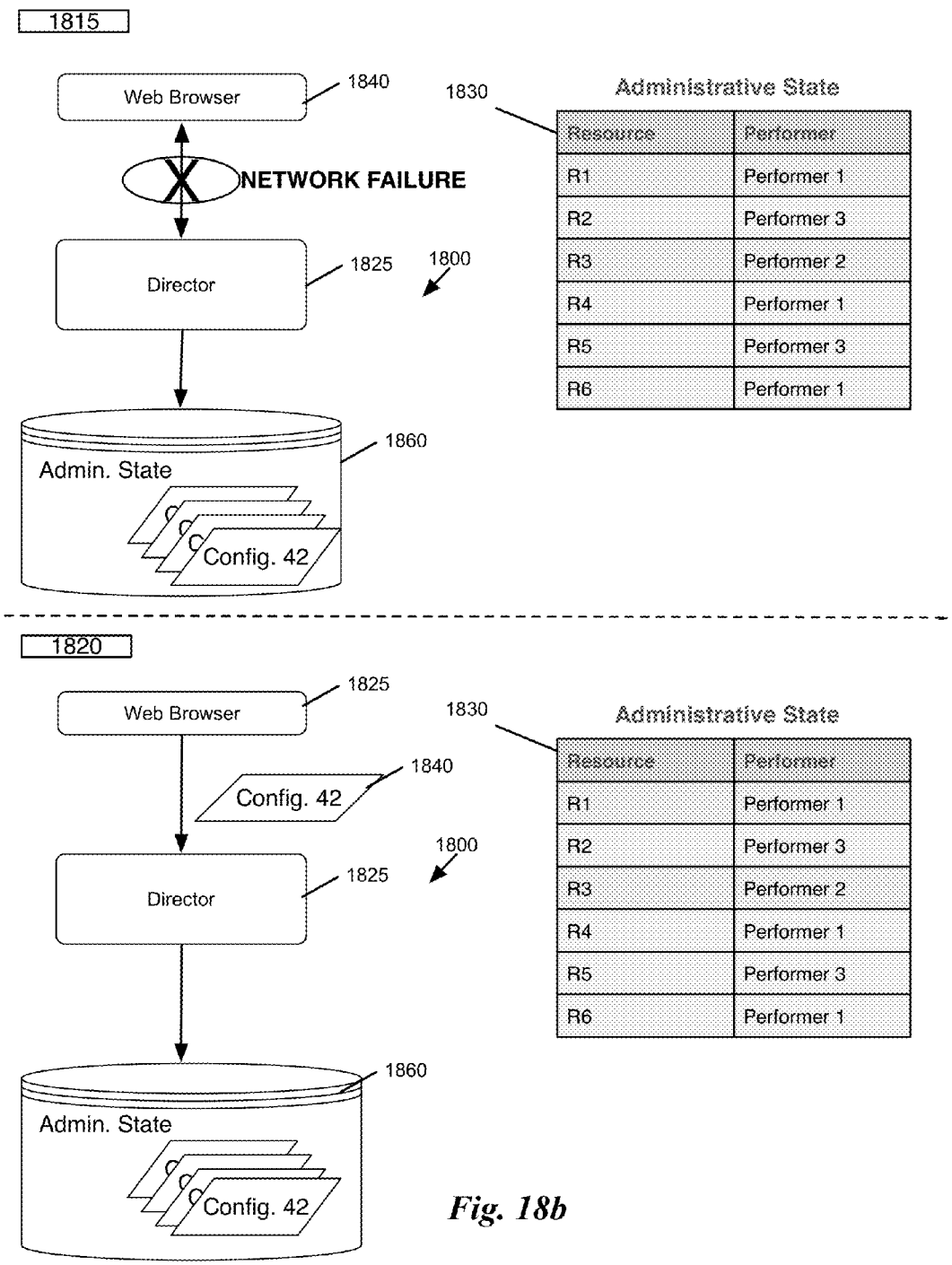
FIG. 18b conceptually illustrates the idempotence of the hosting system with respect to the user interaction with the hosting system.
Figure 18C:
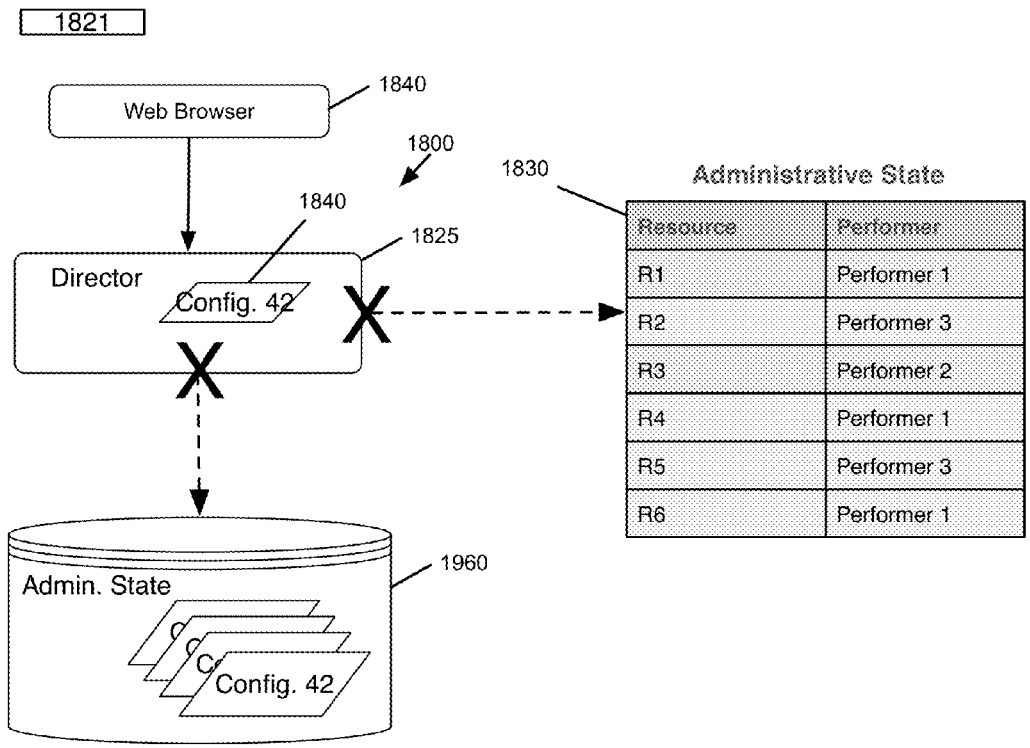
FIG. 18c conceptually illustrates the idempotence of the hosting system with respect to the user interaction with the hosting system.

FIGS. 18*a-c* illustrate the idempotence of the hosting system with respect to the user interaction with the hosting system. In particular FIGS. 18*a-c* illustrate that the hosting system is able to correctly capture the user's intended resource configurations even with the occurrence of a network failure that could otherwise cause the user's intent to be incorrectly captured. FIGS. 18*a-c* illustrate five stages 1805-1821 of a network failure on during a user's interaction with the system for deploying various cloud resources. Stage 1805 illustrates a user interacting with the hosting system 1800 through a web browser 1840. The administrative state table 1830 indicates that no cloud resources have yet been deployed on the hosting system. The director 1825 of the hosting system is receiving a user's cloud resource configuration, illustrated as the "config. 42" data 1850. The configuration data 1850 includes all various information regarding various cloud resources that the particular user would like to deploy across the hosting system.

Stage 1810 of FIG. 18*a* illustrates the hosting system 1800 storing this configuration data 1850 within an administrative state data storage 1860. The hosting system 1800 may store a user's configuration data in a database on the system. In some embodiments, the user's cloud resource configuration data is stored in a data store of the system. The administrative state table 1830 now indicates that six cloud resources, R1-R6, are to be deployed on the hosting system. Furthermore, the administrative state table 1830 has also designated the different performers/hardware nodes that are to host the various cloud resources.

Stage 1815 of FIG. 18*b* illustrates that the hosting system 1800 has encountered a "network failure" with the user's web-browser 1840. Stage 1820 illustrates the hosting system 1800 has once again established a network connection with the user's web-browser 1840. However, the user is once again re-submitting their particular cloud resource configuration, illustrated as the "Config. 42" data 1840. The director 1825 is able to prevent creating multiple instantiations of the same cloud resources. By verifying that the configuration data 1840 is already reflected in the administrative state table 1830, and has been stored within the administrate data storage 1860, the director is able to disregard the second submission of the same cloud resource configuration by the user. Stage 1821 of FIG. 18*c* illustrates the director 1825 has not updated the administrative state table 1830 with the information in the configuration 42 data 1840. Likewise, director 1825 has not stored the configuration 42 data 1840 within the administrative state storage 1860. The hosting system 1800 is thus able to correctly capture a user's intended cloud resource configuration.

IV. Computer System

Many of the above-described features and applications are implemented as software processes that are specified as a set of instructions recorded on a computer readable storage medium (also referred to as computer readable medium). When these instructions are executed by one or more computational element(s) (such as processors or other computational elements like ASICs and FPGAs), they cause the computational element(s) to perform the actions indicated in the instructions. "Computer" is meant in its broadest sense, and can include any electronic device with a processor. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" includes firmware residing in read-only memory or applications stored in magnetic storage which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs when installed to operate on one or more computer systems define one or more specific machine implementations that execute and perform the operations of the software programs.

Figure 19:
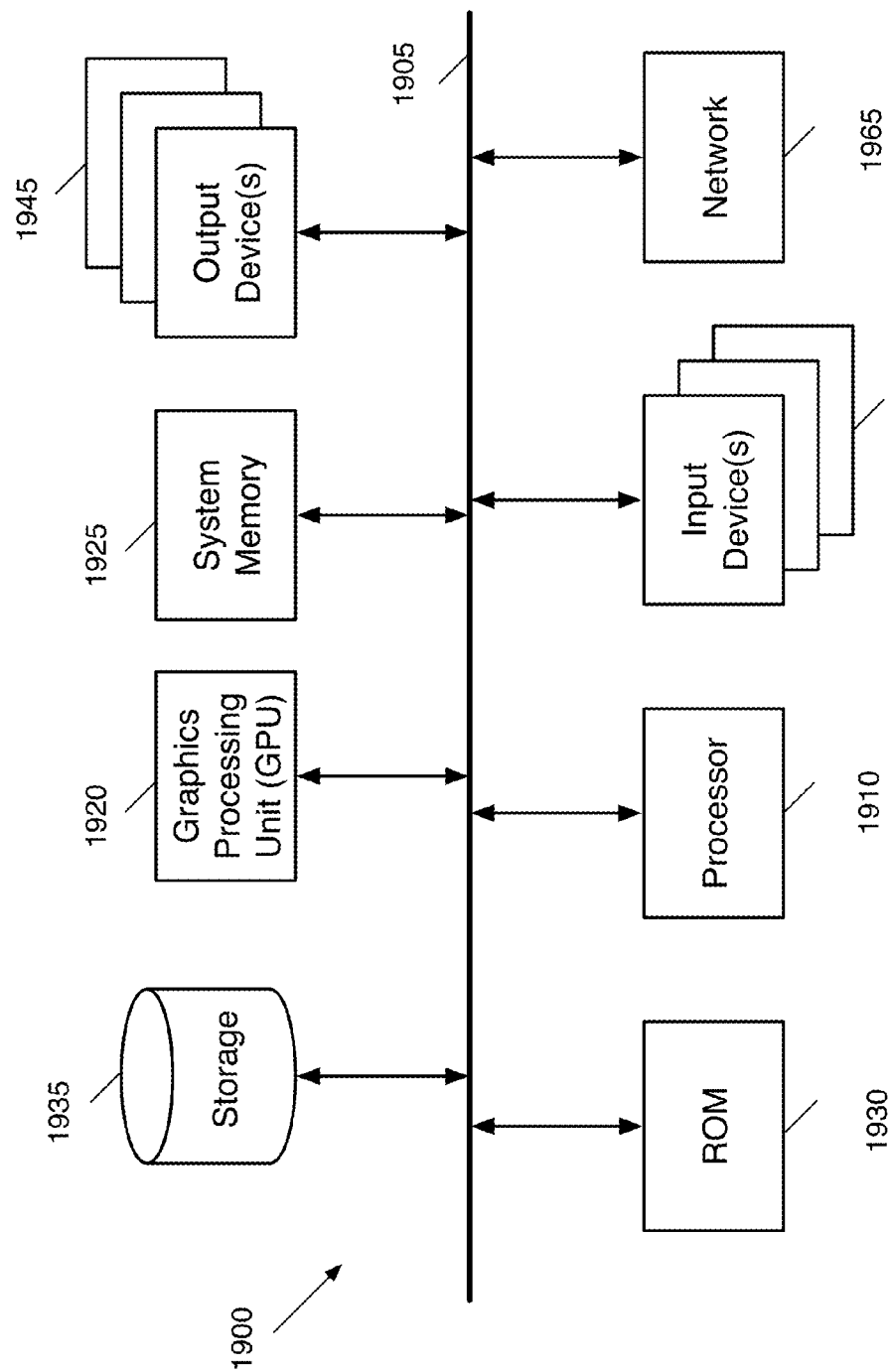
FIG. 19 conceptually illustrates a computer system with which some embodiments of the invention are implemented.

FIG. 19 illustrates a computer system with which some embodiments of the invention are implemented. Such a computer system includes various types of computer readable media and interfaces for various other types of computer readable media. Computer system 1900 includes a bus 1905, at least one processing unit (e.g., a processor) 1910, a graphics processing unit (GPU) 1920, a system memory 1925, a read-only memory 1930, a permanent storage device 1935, input devices 1940, and output devices 1945.

The bus 1905 collectively represents all system, peripheral, and chipset buses that communicatively connect the numerous internal devices of the computer system 1900. For instance, the bus 1905 communicatively connects the processor 1910 with the read-only memory 1930, the GPU 1920, the system memory 1925, and the permanent storage device 1935.

From these various memory units, the processor 1910 retrieves instructions to execute and data to process in order to execute the processes of the invention. In some embodiments, the processor comprises a Field Programmable Gate Array (FPGA), an ASIC, or various other electronic components for executing instructions. Some instructions are passed to and executed by the GPU 1920. The GPU 1920 can offload various computations or complement the image processing provided by the processor 1910.

The read-only-memory (ROM) 1930 stores static data and instructions that are needed by the processor 1910 and other modules of the computer system. The permanent storage device 1935, on the other hand, is a read-and-write memory device. This device is a non-volatile memory unit that stores instructions and data even when the computer system 1900 is off. Some embodiments of the invention use a mass storage device (such as a magnetic or optical disk and its corresponding disk drive) as the permanent storage device 1935.

Other embodiments use a removable storage device (such as a floppy disk, flash drive, or ZIP® disk, and its corresponding disk drive) as the permanent storage device. Like the permanent storage device 1935, the system memory 1925 is a read-and-write memory device. However, unlike storage device 1935, the system memory is a volatile read-and-write memory such as a random access memory. The system memory stores some of the instructions and data that the processor needs at runtime. In some embodiments, the invention's processes are stored in the system memory 1925, the permanent storage device 1935, and/or the read-only memory

1930. For example, the various memory units include instructions for processing multimedia items in accordance with some embodiments. From these various memory units, the processor 1910 retrieves instructions to execute and data to process in order to execute the processes of some embodiments.

The bus 1905 also connects to the input and output devices 1940 and 1945. The input devices enable the user to communicate information and commands to the computer system. The input devices 1940 include alphanumeric keyboards and pointing devices (also called "cursor control devices"). The output devices 1945 display images generated by the computer system. The output devices include printers and display devices, such as cathode ray tubes (CRT) or liquid crystal displays (LCD).

Finally, as shown in FIG. 19, bus 1905 also couples the computer 1900 to a network 1965 through a network adapter (not shown). In this manner, the computer can be a part of a network of computers (such as a local area network ("LAN"), a wide area network ("WAN"), an intranet, or a network of networks such as the Internet. Any or all components of computer system 1900 may be used in conjunction with the invention.

Some embodiments include electronic components, such as microprocessors, storage, and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by a device such as an electronics device, a microprocessor, a processor, a multi-processor (e.g., a chip with several processing units on it) and includes sets of instructions for performing various operations. The computer program excludes any wireless signals, wired download signals, and/or any other ephemeral signals.

Examples of hardware devices configured to store and execute sets of instructions include, but are not limited to, application specific integrated circuits (ASICs), field programmable gate arrays (FPGA), programmable logic devices (PLDs), ROM, and RAM devices. Examples of computer programs or computer code include machine code, such as is produced by a compiler, and files including higher-level code that are executed by a computer, an electronic component, or a microprocessor using an interpreter.

As used in this specification and any claims of this application, the terms "computer", "server", "processor", and "memory" all refer to electronic or other technological devices. These terms exclude people or groups of people. For the purposes of the specification, the terms "display" or "displaying" mean displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

While the invention has been described with reference to numerous specific details, one of ordinary skill in the art will recognize that the invention can be embodied in other specific forms without departing from the spirit of the invention. In addition, a number of the Figures (including FIGS. 5, 9, 10, and 15) conceptually illustrate processes. The specific operations of these processes may not be performed in the exact order shown and described. Specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

The invention claimed is:

1. A method of managing cloud resources on a plurality of nodes of a hosting system in a distributed cloud computing environment, the method comprising:
   receiving a cloud resource configuration;
   identifying a node from the plurality of nodes to host the cloud resource configuration;
   setting an administrative state of the hosting system to reflect the hosting of the cloud resource configuration on the node, the administrative state comprising information for each node from the plurality of nodes in the hosting system, wherein a performer operating on the node manages an operational state of the node based on the administrative state of the node;
   detecting, by the performer, a difference between the operational state of the node and the administrative state of the node; and
   modifying, by the performer, resources of the node in order to align the operational state of the node with the administrative state of the node.

2. The method of claim 1, wherein the administrative state comprises (i) information regarding the cloud resources and (ii) information regarding a mapping of the cloud resources to the plurality of nodes of the hosting system.

3. The method of claim 1, wherein the cloud resources are at least one of a web-server, an application server, a cloud storage share, a dynamic load balancer, a firewall, and a network resource.

4. The method of claim 1, wherein the operational state of the node comprises information regarding the cloud resources deployed on the node.

5. The method of claim 1, wherein the performer operating on the node verifies that the operational state of the node is identical to the administrative state of the node.

6. The method of claim 1, wherein the performer operating on the node manages a deployment of the cloud resources on the node.

7. The method of claim 6, wherein the deployment comprises communicating with a plurality of handlers to configure, partition, and modify the resources of the node.

8. The method of claim 1, wherein the hosting system stores the administrative state of the hosting system at a single centralized location within the system.

9. The method of claim 1, further comprising:
   receiving a query from the performer regarding the administrative state of the node on which the performer operates;
   sending the administrative state to the performer.

10. A hosting system for hosting a plurality of cloud resources for a plurality of users in a distributed cloud computing environment, the hosting system comprising:

a plurality of nodes, each node comprising resources for hosting at least one user specified cloud resource of the plurality of cloud resources;

a centralized director module for managing an administrative state of the hosting system, the administrative state comprising information regarding the plurality of cloud resources and a mapping of the plurality of cloud resources to the plurality of nodes; and a plurality of performers, wherein a performer of the plurality of performers operates on a node of the plurality of nodes to manage an allocation of resources of the node, the performer configured to:

query the centralized director module to receive the administrative state for the particular node on which the performer operates, manage the resources of the node for hosting the at least one user specified cloud resource allocated to the node based on the administrative state of the node;

detect a difference between an operational state of the node and the administrative state of the node; and modify the resources of the node in order to align the operational state of the node with the administrative state of the node.

11. The hosting system of claim 10, further comprising a centralized storage for storing the administrative state of the hosting system.

12. The hosting system of claim 10, wherein the performer operating on the node periodically queries the director to retrieve the administrative state of the node.

13. The hosting system of claim 10, wherein the performer operating on the node manages the operational state of the node, wherein the operational state of the node comprises a status of each cloud resource operating on the node and information regarding a configuration of the cloud resource.

14. The hosting system of claim 13, wherein the difference between the operational state of the node and the administrative state of the node is detected by comparing the operational state of the node with the administrative state of the node.

15. The hosting system of claim 10, wherein the resources of the node are modified by partitioning, formatting, and configuring the resources on the node.

16. The hosting system of claim 10, further comprising a front end server for providing a graphical user interface from which a user specifies a cloud resource configuration.

17. The hosting system of claim 16, wherein the graphical user interface includes UI elements for specifying specifications, image specifications, or network specifications for the cloud resource configuration.

18. The hosting system of claim 10, wherein the plurality of cloud resources comprise at least one of a webserver, an application server, a network server, a load balancer, and a firewall.

19. A non-transitory machine-readable medium storing a program for configuring a set of resources for hosting a cloud resource at a node in a hosting system comprising a plurality of nodes in a distributed cloud computing environment, the program for execution by at least one processing unit, the program comprising:

a set of instructions for periodically sending a query to a director of the hosting system requesting an administrative state of the node;

a set of instructions for receiving the administrative state of the node from the director, the administrative state comprising a plurality of cloud resource configurations to be hosted on a set of resources of the node;

a set of instructions for comparing an operational state of the node with the administrative state of the node, the operational state of the node comprising a plurality of cloud resource configurations currently operating on the node;

a set of instructions for facilitating the configuration of, when the operational state of the node does not match the administrative state of the node, the set of resources according to the administrative state of the node.

20. The non-transitory machine-readable medium of claim 19, wherein the set of instructions for facilitating the configuration of the set of resources comprises a set of instructions for deploying the cloud resource on the node, deleting the cloud resource on the node, or modifying the configuration of the cloud resource already operating on the node.

* * * * *